US012733046B2

(12) United States Patent
Nguyen et al.

(10) Patent No.: US 12,733,046 B2
(45) Date of Patent: Sep. 8, 2026

(54) ELECTRONIC DEVICE AND METHOD FOR REQUESTING NSSAI IN WIRELESS COMMUNICATION NETWORK

(71) Applicant: Samsung Electronics Co., Ltd., Suwon-si (KR)

(72) Inventors: Duc Doan Nguyen, Bac Ninh (VN); Van Hung Nguyen, Bac Ninh (VN); Minh Duc Hoang, Bac Ninh (VN); The Thoi Nguyen, Bac Ninh (VN); Van Thinh Nguyen, Bac Ninh (VN); Van Hau Truong, Bac Ninh (VN)

(73) Assignee: Samsung Electronics Co., Ltd., Suwon-si (KR)

( * ) Notice: Subject to any disclaimer, the term of this patent is extended or adjusted under 35 U.S.C. 154(b) by 286 days.

(21) Appl. No.: 18/496,369

(22) Filed: Oct. 27, 2023

(65) Prior Publication Data

US 2024/0155707 A1 May 9, 2024

(30) Foreign Application Priority Data

Nov. 7, 2022 (KR) ........................ 10-2022-0147297
Dec. 9, 2022 (KR) ........................ 10-2022-0171790

(51) Int. Cl.
*H04W 76/11* (2018.01)
*H04W 76/10* (2018.01)

(52) U.S. Cl.
CPC .................................. *H04W 76/10* (2018.02)

(58) Field of Classification Search
USPC .......................................................... 370/328
See application file for complete search history.

(56) References Cited

U.S. PATENT DOCUMENTS 11,129,094 B2 9/2021 Lee et al.
2022/0264503 A1 8/2022 Starsinic et al.
(Continued)

FOREIGN PATENT DOCUMENTS

KR 10-2022-0066743 A 5/2022
WO 2022/152616 A2 7/2022

OTHER PUBLICATIONS

ETSI TS 123.503 V17.5.0 (Jul. 2022) (Year: 2022).*
ETSI TS 124.526 V17.7.0 (Jul. 2022) (Year: 2022).*

*Primary Examiner* — Gregory B Sefcheck
*Assistant Examiner* — Majid Esmaeilian
(74) *Attorney, Agent, or Firm* — Jefferson IP Law, LLP

(57) ABSTRACT

The disclosure relates to a fifth generation (5G) or sixth generation (6G) communication system for supporting a higher data transfer rate. A method performed by a user equipment in a wireless communication system is provided. The method includes executing an application in the user equipment, identifying a user equipment route selection policy (URSP) rule mapped to the application, based on configuration information on the application, identifying a single-network slice selection assistance information (S-NSSAI) mapped to the application, based on the URSP rule mapped to the application, and transmitting a message requesting registration of the S-NSSAI mapped to the application to a core network via a base station. The S-NSSAI may correspond to a network slice selection assistance information (NSSAI) not allowed by the core network to be registered among NSSAIs configured for the user equipment.

19 Claims, 17 Drawing Sheets

(56) References Cited

U.S. PATENT DOCUMENTS

| | | | | |
|---|---|---|---|---|
| 2022/0264540 | A1 | 8/2022 | Panchal et al. | |
| 2023/0138108 | A1* | 5/2023 | Mysore Viswanath | H04W 48/18 455/435.1 |
| 2023/0397086 | A1* | 12/2023 | Kim | H04W 76/11 |
| 2024/0323828 | A1* | 9/2024 | Lanev | H04W 48/18 |
| 2024/0340839 | A1* | 10/2024 | Ghimire | H04L 5/0048 |
| 2024/0349219 | A1* | 10/2024 | Kuge | H04W 60/06 |
| 2024/0389011 | A1* | 11/2024 | Ishii | H04W 76/30 |
| 2025/0088993 | A1* | 3/2025 | Kuge | H04W 60/00 |
| 2025/0142463 | A1* | 5/2025 | Wang | H04W 76/20 |
| 2025/0227606 | A1* | 7/2025 | Wang | H04W 48/18 |
| 2025/0287296 | A1* | 9/2025 | Velev | H04W 8/22 |
| 2026/0059467 | A1* | 2/2026 | Velev | H04W 48/18 |

* cited by examiner

ELECTRONIC DEVICE AND METHOD FOR REQUESTING NSSAI IN WIRELESS COMMUNICATION NETWORK

CROSS-REFERENCE TO RELATED APPLICATION(S)

This application is based on and claims priority under 35 U.S.C. § 119(a) of a Korean patent application number 10-2022-0147297, filed on Nov. 7, 2022, in the Korean Intellectual Property office, and of a Korean patent application number 10-2022-0171790, filed on Dec. 9, 2022, in the Korean Intellectual Property Office, the disclosure of each of which is incorporated by reference herein in its entirety.

BACKGROUND

1. Field

The disclosure relates to an electronic device and a device for requesting a network slice selection assistance information (NSSAI) in a wireless communication network.

2. Description of Related Art

Fifth generation (5G) mobile communication technologies define broad frequency bands such that high transmission rates and new services are possible, and can be implemented not only in “Sub 6 gigahertz (GHz)” bands such as 3.5 GHz, but also in “Above 6 GHz” bands referred to as millimeter wave (mmWave) including 28 GHz and 39 GHz. In addition, it has been considered to implement sixth generation (6G) mobile communication technologies (referred to as beyond 5G systems) in terahertz (THz) bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced mobile broadband (eMBB), ultra reliable low latency communications (URLLC), and massive machine-type communications (mMTC), there has been ongoing standardization regarding beamforming and massive multi input multi output (MIMO) for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of bandwidth part (BWP), new channel coding methods, such as a low density parity check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies, such as vehicle-to-everything (V2X) for aiding driving determination by autonomous vehicles based on information regarding positions and states of vehicles transmitted by the vehicles and for enhancing user convenience, new radio unlicensed (NR-U) aimed at system operations conforming to various regulation-related requirements in unlicensed bands, new radio (NR) user equipment (UE) power saving, non-terrestrial network (NTN) which is UE-satellite direct communication for providing coverage in an area in which communication with terrestrial networks is unavailable, and positioning.

Moreover, there has been ongoing standardization in air interface architecture/protocol regarding technologies, such as industrial Internet of things (IIoT) for supporting new services through interworking and convergence with other industries, integrated access and backhaul (IAB) for providing a node for network service area expansion by supporting a wireless backhaul link and an access link in an integrated manner, mobility enhancement including conditional handover and dual active protocol stack (DAPS) handover, and two-step random access for simplifying random access procedures (2-step random access channel (RACH) for NR). There also has been ongoing standardization in system architecture/service regarding a 5G baseline architecture (for example, service based architecture or service based interface) for combining network functions virtualization (NFV) and software-defined networking (SDN) technologies, and mobile edge computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended reality (XR) for efficiently supporting augmented reality (AR), virtual reality (VR), mixed reality (MR) and the like, 5G performance improvement and complexity reduction by utilizing artificial intelligence (AI) and machine learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies, such as full dimensional MIMO (FD-MIMO), array antennas and large-scale antennas, metamaterial-based lenses and antennas for improving coverage of terahertz band signals, high-dimensional space multiplexing technology using orbital angular momentum (OAM), and reconfigurable intelligent surface (RIS), but also full-duplex technology for increasing frequency efficiency of 6G mobile communication technologies and improving system networks, AI-based communication technology for implementing system optimization by utilizing satellites and artificial intelligence (AI) from the design stage and internalizing end-to-end AI support functions, and next-generation distributed computing technology for implementing services at levels of complexity exceeding the limit of UE operation capability by utilizing ultra-high-performance communication and computing resources.

The above information is presented as background information only to assist with an understanding of the disclosure. No determination has been made, and no assertion is made, as to whether any of the above might be applicable as prior art with regard to the disclosure.

SUMMARY

In 5G communication, network slicing that is a method of dividing a physical core network into multiple virtualized networks is provided. A user equipment is required to use a network slice mapped to each application executed in the user equipment due to network slicing.

Meanwhile, a user equipment is needed to establish a connection with a network slice mapped to an application every time the application is executed. The user equipment has to determine or select a user equipment route selection policy (URSP) rule mapped to the application to establish the connection.

However, in case that the user equipment is unable to identify the URSP rule mapped to the application, the application fails to be executed in the user equipment, or the user equipment has to transmit and/or receive data associated with the application through a communication channel having a low quality.

Aspects of the disclosure are to address at least the above-mentioned problems and/or disadvantages and to provide at least the advantages described below. Accordingly, an aspect of the disclosure is to provide a user equipment transmits a message, which requests to accept registration of a network slice selection assistance information (S-NSSAI) of a URSP rule mapped to an application, to a core network via a base station.

Additional aspects will be set forth in part in the description which follows and, in part, will be apparent from the description, or may be learned by practice of the presented embodiments.

In accordance with an aspect of the disclosure, a method performed by a user equipment in a wireless communication system is provided. The method includes executing an application in the user equipment, identifying an URSP rule mapped to the application, based on configuration information on the application, identifying an S-NSSAI mapped to the application, based on the URSP rule mapped to the application, and transmitting a message requesting registration of the S-NSSAI mapped to the application to a core network via a base station. The S-NSSAI corresponds to an NSSAI not allowed by the core network to be registered among NSSAIs configured for the user equipment.

In accordance with another aspect of the disclosure, a user equipment in a wireless communication system is provided. The user equipment includes a transceiver and at least one processor. The at least one processor is configured to execute an application in the user equipment, and identify a URSP rule mapped to the application, based on configuration information on the application. The at least one processor is configured to identify an S-NSSAI mapped to the application, based on the URSP rule mapped to the application, and transmit a message requesting registration of the S-NSSAI mapped to the application to a core network via a base station. The S-NSSAI corresponds to an NSSAI not allowed by the core network to be registered among NSSAIs configured for the user equipment.

According to an embodiment of the disclosure, user experience for an application executed in a user equipment is increased.

Various other effects identified explicitly or implicitly through this document is provided.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
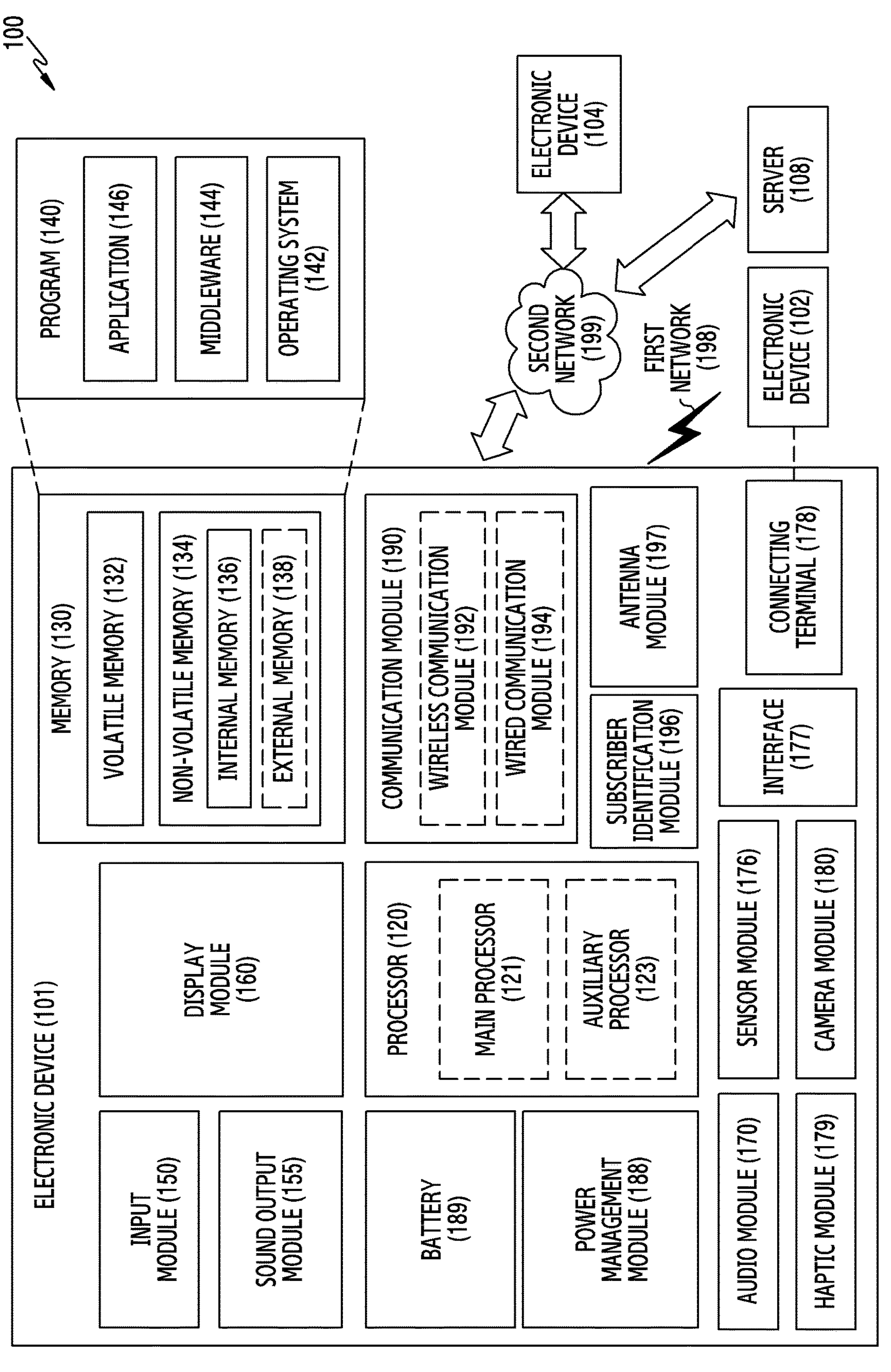
FIG. 1 is a block diagram of an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or communicate with an external electronic device 104 or a server 108 via a second network 199 (e.g., a long-range wireless communication network). According to an embodiment of the disclosure, the electronic device 101 may communicate with the external electronic device 104 via the server 108. According to an embodiment of the disclosure, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments of the disclosure, at least one of the components (e.g., the connecting terminal 178) may be omitted from the electronic device 101, or one or more other components may be added in the electronic device 101. In some embodiments of the disclosure, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., a sleep) state, or together with the main processor 121 while the main processor 121 is in an active (e.g., executing an application) state. According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence model is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment of the disclosure, the display module 160 may include a touch sensor adapted to detect a touch, or a pressure sensor adapted to measure the intensity of force incurred by the touch.

The audio module 170 may convert a sound into an electrical signal and vice versa. According to an embodiment of the disclosure, the audio module 170 may obtain the sound via the input module 150, or output the sound via the sound output module 155 or an external electronic device (e.g., the external electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly or wirelessly. According to an embodiment of the disclosure, the interface 177 may include, for example, a high definition multimedia interface (HDMI), a universal serial bus (USB) interface, a secure digital (SD) card interface, or an audio interface.

The connecting terminal 178 may include a connector via which the electronic device 101 may be physically connected with the external electronic device (e.g., the external electronic device 102). According to an embodiment of the disclosure, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to an embodiment of the disclosure, the wireless communication module 192 may support a peak data rate (e.g., 20 gigabits per second (Gbps) or more) for implementing eMBB, loss coverage (e.g., 164 decibels (dB) or less) for implementing mMTC, or U-plane latency (e.g., 0.5 milliseconds (ms) or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment of the disclosure, the antenna module 197 may include an antenna including a radiating element composed of a conductive material or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197. According to various embodiments of the disclosure, the antenna module 197 may form a mmWave antenna module. According to an embodiment of the disclosure, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment of the disclosure, the external electronic device 104 may include an Internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., a smart home, a smart city, a smart car, or healthcare) based on 5G communication technology or IoT-related technology.

The electronic device according to various embodiments disclosed herein may be one of various types of electronic devices. The electronic devices may include, for example, a portable communication device (e.g., a smart phone), a computer device, a portable multimedia device, a portable medical device, a camera, a wearable device, or a home appliance. The electronic device according to embodiments of the disclosure is not limited to those described above.

It should be appreciated that various embodiments of the disclosure and the terms used therein are not intended to limit the technological features set forth herein to particular embodiments and include various changes, equivalents, or alternatives for a corresponding embodiment. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "a first", "a second", "the first", and "the second" may be used to simply distinguish a corresponding element from another, and does not limit the elements in other aspect (e.g., importance or order). It is to be understood that if an element (e.g., a first element) is referred to, with or without the term "operatively" or "communicatively", as "coupled with/to" or "connected with/to" another element (e.g., a second element), it means that the element may be coupled/connected with/to the other element directly (e.g., wiredly), wirelessly, or via a third element.

As used herein, the term "module" may include a unit implemented in hardware, software, or firmware, and may be interchangeably used with other terms, for example, "logic," "logic block," "component," or "circuit". The "module" may be a minimum unit of a single integrated component adapted to perform one or more functions, or a part thereof. For example, according to an embodiment of the disclosure, the "module" may be implemented in the form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more stored instructions from the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each element (e.g., a module or a program) of the above-described elements may include a single entity or multiple entities, and some of the multiple entities may be separately disposed in any other element. According to various embodiments of the disclosure, one or more of the above-described elements may be omitted, or one or more other elements may be added. Alternatively or additionally, a plurality of elements (e.g., modules or programs) may be integrated into a single element. In such a case, according to various embodiments of the disclosure, the integrated element may still perform one or more functions of each of the plurality of elements in the same or similar manner as they are performed by a corresponding one of the plurality of elements before the integration. According to various embodiments of the disclosure, operations performed by the module, the program, or another element may be carried out sequentially, in parallel, repeatedly, or heuristically, or one or more of the operations may be executed in a different order or omitted, or one or more other operations may be added.

Figure 2:
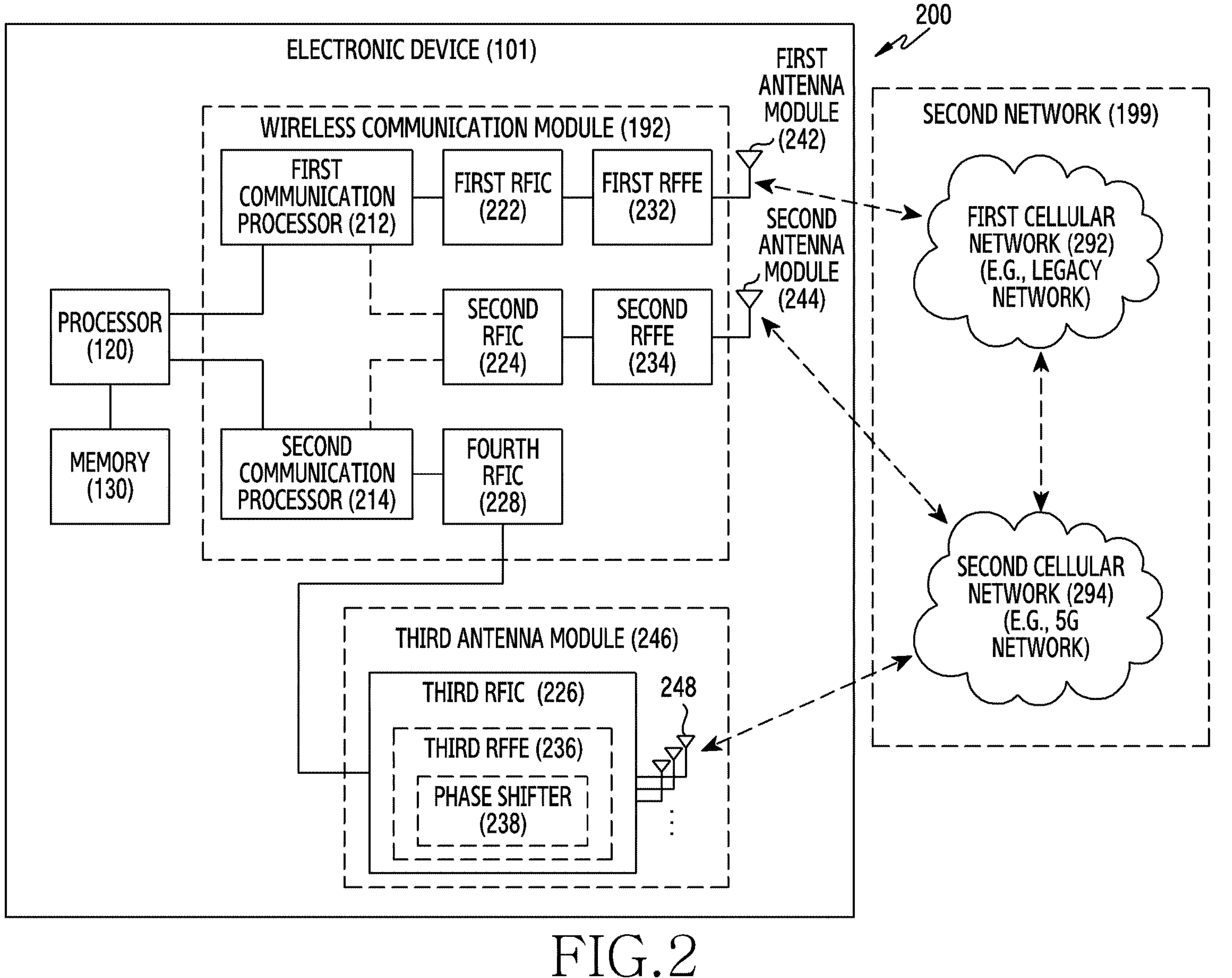
FIG. 2 is a block diagram of an electronic device for supporting legacy network communication and fifth generation (5G) network communication according to an embodiment of the disclosure.

FIG. 2 is a block diagram 200 of an electronic device for supporting legacy network communication and 5G network communication according to an embodiment of the disclosure.

Referring to FIG. 2, the electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include the processor 120 and the memory 130. The second network 199 may include a first network 292 and a second network 294. According to another embodiment of the disclosure, the electronic device 101 may further include at least one component among the components illustrated in FIG. 1, and the second network 199 may further include at least another network. According to an embodiment of the disclosure, the first communication processor 212, the second communication processor 214, the first RFIC 222, the second RFIC 224, the fourth RFIC 228, the first RFFE 232, and the second RFFE 234 may configure at least a part of the wireless communication module 192. According to another embodiment of the disclosure, the fourth RFIC 228 may be omitted, or may be included as a part of the third RFIC 226.

The first communication processor 212 may establish a communication channel within a band to be used in wireless communication with the first network 292 and may support legacy network communication performed through the established communication channel. According to various embodiments of the disclosure, the first network may be a legacy network including a second generation (2G), third generation (3G), 4G, or long-term evolution (LTE) network. The second communication processor 214 may establish a communication channel corresponding to a designated band (e.g., about 6 GHz-60 GHz) among bands to be used in wireless communication with the second network 294, and may support 5G network communication performed through the established communication channel. According to various embodiments of the disclosure, the second network 294 may be a 5G network defined in third generation partnership project (3GPP). Additionally, according to an embodiment of the disclosure, the first communication processor 212 or the second communication processor 214 may establish a communication channel corresponding to another designated band (e.g., about 6 GHz or lower) among bands to be used in wireless communication with the second network 294, and may support 5G network communication performed through the established communication channel. According to an embodiment of the disclosure, the first communication processor 212 and the second communication processor 214 may be implemented in a single chip or a single package. According to various embodiments of the disclosure, the first communication processor 212 or the second communication processor 214 may be configured in a single chip or a single package together with the processor 120, the auxiliary processor 123, or the communication module 190.

The first RFIC 222 may convert, at the time of transmission, a baseband signal generated by the first communication processor 212 into a radio frequency (RF) signal having about 700 MHz to about 3 GHz, which is used in the first network 292 (e.g., a legacy network). At the time of reception, an RF signal may be obtained from the first network 292 (e.g., a legacy network) through an antenna (e.g., the first antenna module 242), and may be preprocessed by an RFFE (e.g., the first RFFE 232). The first RFIC 222 may convert a preprocessed RF signal into a baseband signal so as to enable the preprocessed RF signal to be processed by the first communication processor 212.

The second RFIC 224 may convert, at the time of transmission, a baseband signal generated by the first communication processor 212 or the second communication processor 214 into an RF signal (hereinafter, a 5G Sub6 RF signal) within a Sub6 band (e.g., about 6 GHz or lower) used in the second network 294 (e.g., a 5G network). At the time of reception, a 5G Sub6 RF signal may be obtained from the second network 294 (e.g., a 5G network) through an antenna (e.g., the second antenna module 244), and may be preprocessed by an RFFE (e.g., the second RFFE 234). The second RFIC 224 may convert a preprocessed 5G Sub6 RF signal into a baseband signal so as to enable the preprocessed 5G Sub6 RF signal to be processed by a corresponding communication processor among the first communication processor 212 or the second communication processor 214.

The third RFIC 226 may convert a baseband signal generated by the second communication processor 214 into an RF signal (hereinafter, a 5G Above6 RF signal) within a 5G Above6 band (e.g., about 6 GHz-about 60 GHz) to be used in the second network 294 (e.g., a 5G network). At the time of reception, a 5G Above6 RF signal may be obtained from the second network 294 (e.g., a 5G network) through an antenna (e.g., the antenna 248), and may be preprocessed by a third RFFE 236. The third RFIC 226 may convert a preprocessed 5G Above6 RF signal into a baseband signal so as to enable the preprocessed 5G Above6 RF signal to be processed by the second communication processor 214. According to an embodiment of the disclosure, the third RFFE 236 may be configured as a part of the third RFIC 226.

According to an embodiment of the disclosure, the electronic device 101 may include the fourth RFIC 228 separately from the third RFIC 226 or as at least a part thereof. In this case, the fourth RFIC 228 may convert a baseband signal generated by the second communication processor 214 into an RF signal (hereinafter, an IF signal) within an intermediate frequency band (e.g., about 9 GHz-11 GHz), and then transfer the IF signal to the third RFIC 226. The third RFIC 226 may convert an IF signal into a 5G Above6 RF signal. At the time of reception, a 5G Above6 RF signal may be received from the second network 294 (e.g., a 5G network) through an antenna (e.g., the antenna 248), and may be converted into an IF signal by the third RFFE 226. The fourth RFIC 228 may convert an IF signal into a baseband signal so as to enable the IF signal to be processed by the second communication processor 214.

According to an embodiment of the disclosure, the first RFIC 222 and the second RFIC 224 may be implemented as at least a part of a single chip or a single package. According to an embodiment of the disclosure, the first RFFE 232 and the second RFFE 234 may be implemented as at least a part of a single chip or a single package. According to an embodiment of the disclosure, at least one antenna module among the first antenna module 242 or the second antenna module 244 may be omitted or combined with another antenna module so as to process RF signals within multiple corresponding bands.

According to an embodiment of the disclosure, the third RFIC 226 and the antenna 248 may be arranged on the same substrate to configure a third antenna module 246. For example, the wireless communication module 192 or the processor 120 may be disposed on a first substrate (e.g., a main PCB). In this case, the third RFIC 226 may be disposed in a partial area (e.g., a lower surface) of a second substrate (e.g., a sub PCB) separate from the first substrate, and the antenna 248 may be disposed in another partial area (e.g., an upper surface), whereby the third antenna module 246 is configured. The arrangement of the third RFIC 226 and the antenna 248 on the same substrate enables reduction of the length of a transmission line therebetween. This may reduce, for example, loss (e.g., attenuation) of, by a transmission line, a signal within a high frequency band (e.g., about 6 GHz-about 60 GHz) used in 5G network communication. Accordingly, the electronic device 101 may improve the quality or speed of communication with the second network 294 (e.g., a 5G network).

According to an embodiment of the disclosure, the antenna 248 may be configured as an antenna array including multiple antenna elements which are usable in beamforming. In this case, the third RFIC 226 may include, for example, as a part of the third RFFE 236, multiple phase shifters 238 corresponding to the multiple antenna elements. At the time of transmission, each of the multiple phase shifters 238 may convert the phase of a 5G Above6 RF signal to be transmitted to an outside (e.g., a base station of a 5G network) of the electronic device 101 through a corresponding antenna element. At the time of reception, each of the multiple phase shifters 238 may convert, into an identical or a substantially identical phase, the phase of a 5G Above6 RF signal which has been received from the outside through a corresponding antenna element. This enables transmission or reception between the electronic device 101 and the outside through beamforming.

The second network 294 (e.g., a 5G network) may be operated independently of the first network 292 (e.g., a legacy network) (e.g., stand-alone (SA)), or may be operated while being connected thereto (e.g., non-standalone (NSA)). For example, there may be only an access network (e.g., a 5G radio access network (RAN) or a next generation RAN (NG RAN)) in a 5G network without a core network (e.g., a next generation core (NGC)). In this case, the electronic device 101 may access an access network of a 5G network, and then access an external network (e.g., Internet) under the control of a core network (e.g., an evolved packed core (EPC)) of a legacy network. Protocol information (e.g., LTE protocol information) for communication with a legacy network or protocol information (e.g., new radio (NR) protocol information) for communication with a 5G network are stored in the memory 230, and may be accessed by another component (e.g., the processor 120, the first communication processor 212, or the second communication processor 214).

Figure 3:
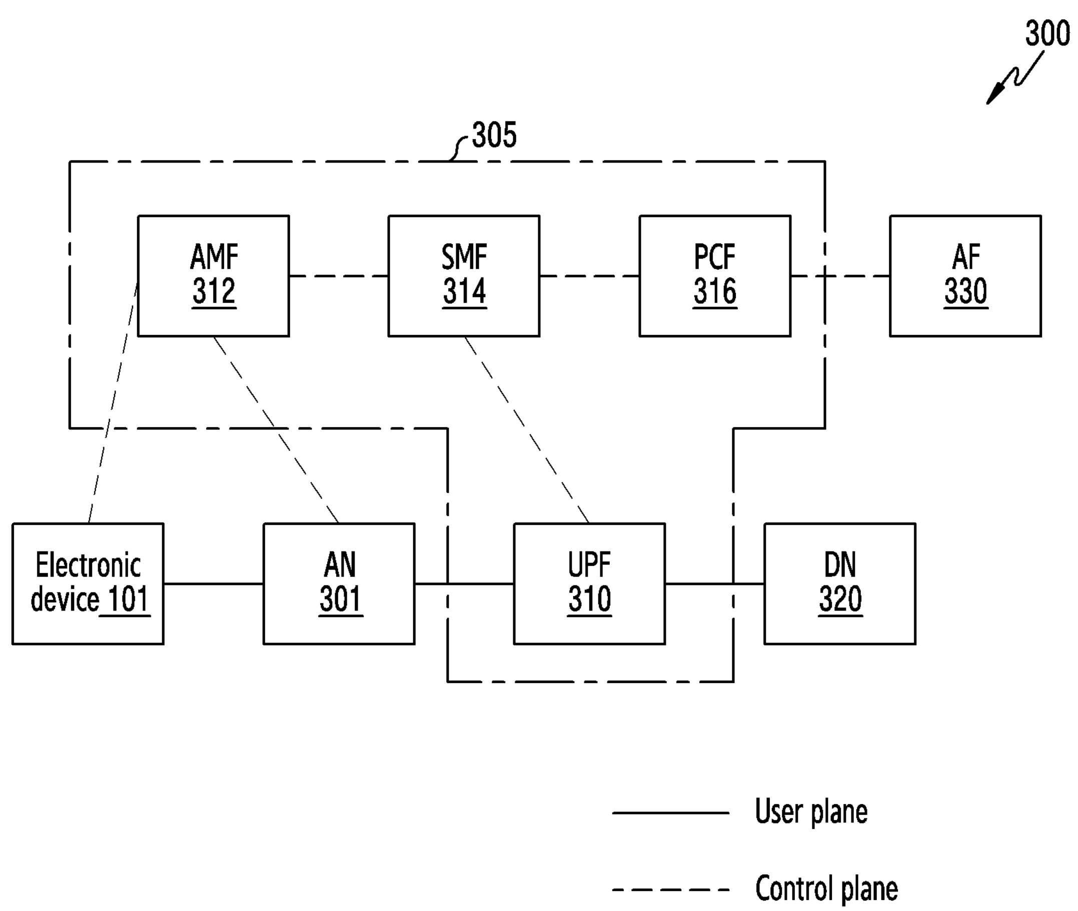
FIG. 3 illustrates an architecture of a network according to an embodiment of the disclosure.

FIG. 3 illustrates an architecture of a network according to an embodiment of the disclosure.

Referring to FIG. 3, a network environment 300 according to an embodiment may include the electronic device 101 (e.g., the electronic device 101 in FIG. 1) and a 5G network (e.g., the second network 294 in FIG. 2) defined in 3GPP. For example, the functions, the structures, or the arrangement of elements illustrated in FIG. 3 may be implemented with reference to a specification (e.g., technical specification (TS) 23.501).

For example, each element included in the network environment 300 may mean a physical entity unit, or may mean a software or module unit capable of performing an individual function. In the network environment 300, a user plane may indicate a path for transmitting or receiving a data packet required for receiving a service by a user of the electronic device 101, and a control plane may indicate a path for transmitting and/or receiving a control signal for connection, management, or disconnection of a network used for transmission of a data packet.

According to an embodiment of the disclosure, the electronic device 101 may mean a device that is used by a user. The electronic device 101 may indicate, for example, a terminal, a user equipment (UE), a mobile station, a subscriber station, a remote terminal, a wireless terminal, or a user device.

According to an embodiment of the disclosure, an access network (AN) 301 may provide a channel for wireless communication with the electronic device 101. The AN 301 may indicate a radio access network (RAN), a base station, an eNodeB (eNB), a 5G node, a transmission/reception point (TRP), or a $5^{th}$ generation NodeB (5GNB).

According to an embodiment of the disclosure, a data network (DN) 320 may transmit or receive data (or a data packet) to or from the electronic device 101 over a core network (CN) 305 and the AN 301, thereby providing a service (e.g., an Internet service or an IP multimedia subsystem (IMS) service).

According to an embodiment of the disclosure, the CN 305 may include a user plane function (UPF) 310, an access & mobility management function (AMF) 312, a session management function (SMF) 314, and/or a policy control function (PCF) 316. The types and the number of elements included in the CN 305 are not limited to an example illustrated in FIG. 3. At least one substantially identical element (e.g., the UPF 310) or at least another element (e.g., a unified data management (UDM) or a network function repository function (NRF)) may be further included therein, or at least one element may be omitted therefrom.

According to an embodiment of the disclosure, the AMF 312 and the SMF 314 may perform the same functions as a mobility management entity (MME) in a 4G network, or perform at least some of the MME functions. For example, the AMF 312 may manage information related to access authorization of the electronic device 101 for the CN 305 and the mobility of the electronic device 101. The SMF 314 may generate a session for data transmission between the electronic device 101 and the DN 320 through the UPF 310, and control UPF re-location that changes a UPF (e.g., the UPF 310) connected to the electronic device 101.

According to an embodiment of the disclosure, the PCF 316 may perform the same functions as a policy control resource function (PCRF) in a 4G network, or perform at least some of the PCRF functions. For example, the PCF 316 may determine a policy related to data transmission of the electronic device 101, based on information related to quality of service (QoS) or charging information.

According to an embodiment of the disclosure, the UPF 310 may perform a function of a packet data network gateway (P-GW) and a serving gateway (S-GW) in a 4G network (e.g., a long-term evolution (LTE) network). For example, the UPF 310 may perform a routing function so that data is transmitted and/or received between the electronic device 101 and the DN 320 on the user plane, and may perform an anchor function of assigning an Internet protocol corresponding to the DN 320.

According to an embodiment of the disclosure, an application function (AF) 330 may provide information related to QoS to the PCF 316.

Network functions of the disclosure may be referenced as network entities. For example, the AMF 312 may be referred to as an AMF entity or an AMF node. For example, the SMF 314 may be referred to as an SMF entity or an SMF node. For example, the PCF 316 may be referred to as a PCF entity or an PCF node.

Figure 4:
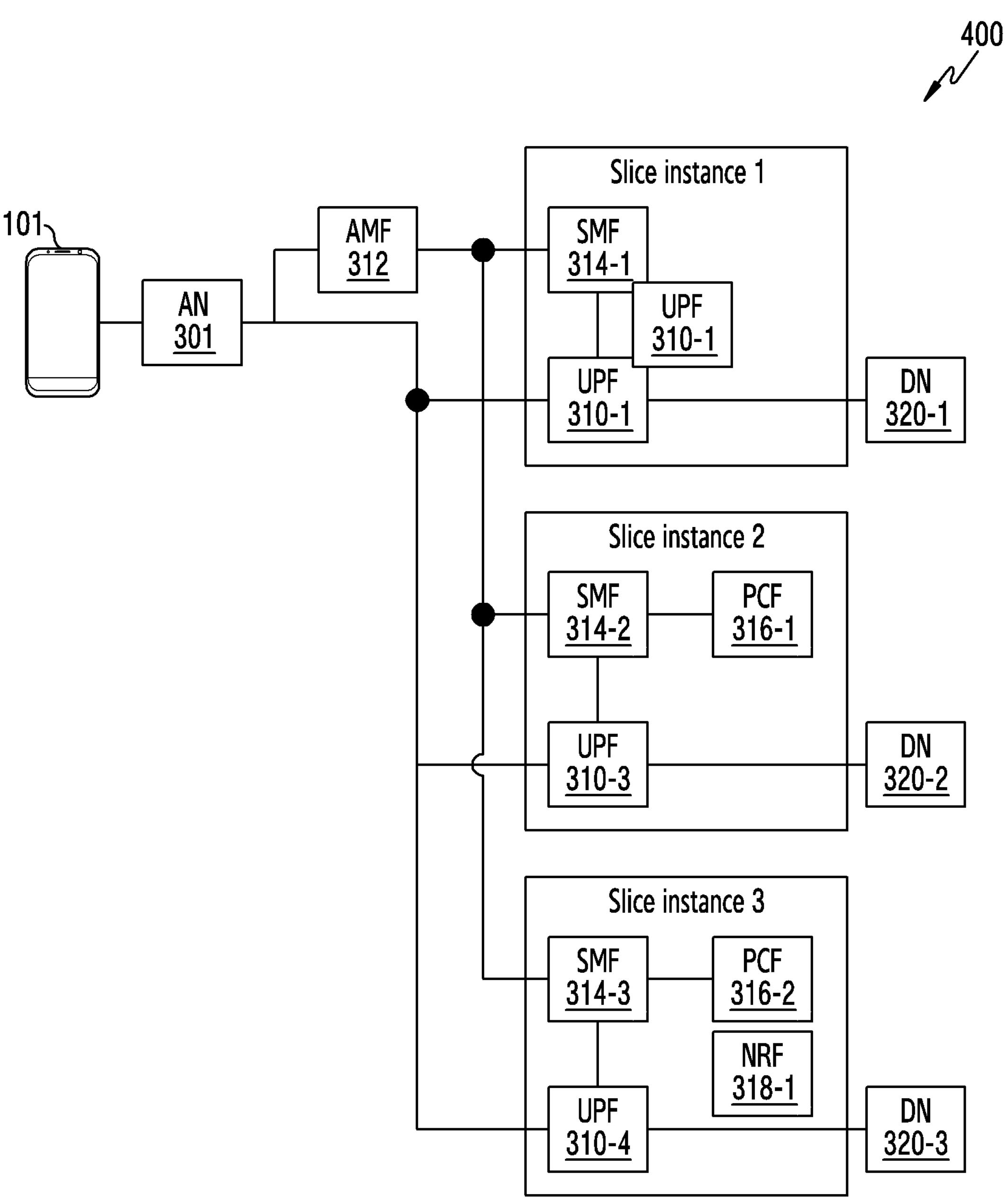
FIG. 4 illustrates network slices according to an embodiment of the disclosure.

FIG. 4 illustrates network slices according to an embodiment of the disclosure.

Referring to FIG. 4, in a network 400 (e.g., the network environment 300 in FIG. 3) according to an embodiment of the disclosure, the AMF 312 may be connected to a plurality of network slices 1, 2, and 3. A network slice in the disclosure may be referred to as a network slice instance or a slice instance.

Referring to FIG. 4 in the disclosure, an example in which one AMF 312 is connected to the AN 301 is illustrated. However, this merely corresponds to an example, and a plurality of AMFs may be connected to the AN 301.

According to an embodiment of the disclosure, the network slices 1, 2, and 3 may include at least some different elements or include a different number of elements to provide different service types or service qualities. For example, the network slice 1 connected to a DN 320-1 may include one SMF (e.g., an SMF 314-1) and a plurality of UPFs (e.g., UPFs 310-1 and 310-2). As another example, the network slice 2 connected to a DN 320-2 may include one SMF (e.g., an SMF 314-2), one UPF (e.g., a UPF 310-3), and one PCF (e.g., a PCF 316-1) connected to the SMF. As another example, the network slice 3 connected to a DN 320-3 may include one SMF (e.g., an SMF 314-3), one UPF (e.g., a UPF 310-4), one PCF (e.g., a PCF 316-2) connected to the SMF, and/or an NRF (e.g., an NRF 318-1).

For example, a service type may include enhanced mobile broadband (eMBB), ultra-reliable and low latency communication (URLLC), and/or massive machine type communication (mMTC), which are defined in a 5G network. For example, eMBB may indicate a network service requiring a high data transfer rate and a low latency time, as a smartphone service. For example, URLLC may indicate a network service requiring a low latency time and a high reliability, such as a disaster rescue network or vehicle to everything (V2X). For example, mMTC may indicate a network service not requiring a low latency time while a plurality of entities are connected to each other like Internet of things (IoT). For example, a service quality may include a quality of service (QoS), such as a minimum bandwidth, a latency time, or a maximum error rate for data transmission.

According to an embodiment of the disclosure, the electronic device 101 may establish a packet data unit (PDU) session by means of a network slice determined according to a requirement of a user or an application being executed in the electronic device 101.

Figure 5:
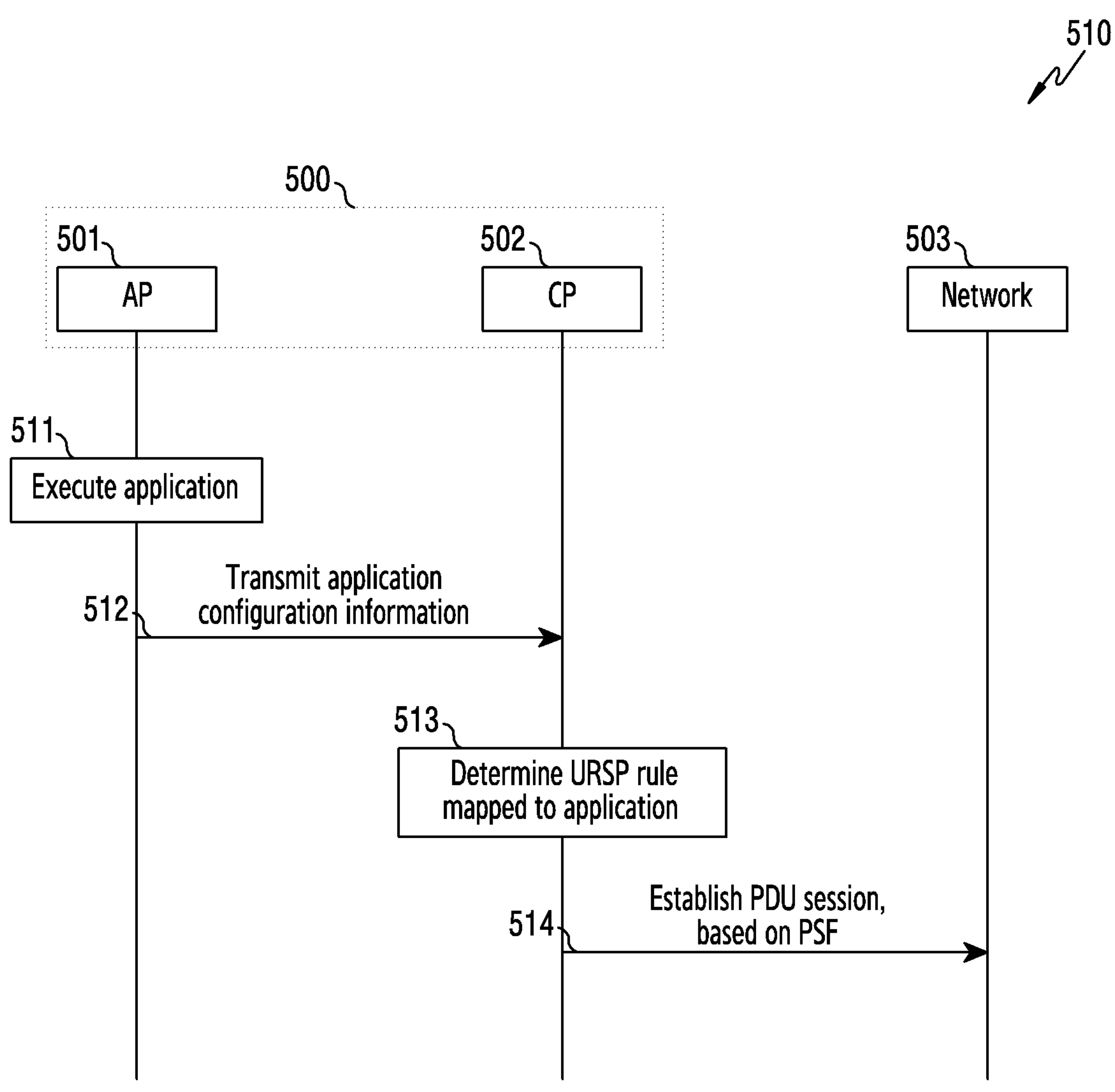
FIG. 5 is a diagram illustrating a method of establishing a protocol data unit (PDU) session, based on a route selection descriptor (RSD) of a user equipment route selection policy (URSP) rule mapped to an application according to an embodiment of the disclosure.

FIG. 5 is a diagram illustrating a method of establishing a PDU session, based on an RSD of a URSP rule mapped to an application according to an embodiment of the disclosure.

Referring to FIG. 5, a wireless communication system 510 according to an embodiment may include a user equipment 500 and/or a network 503. The user equipment 500 may include an application processor (AP) 501 and/or a communication processor (CP) 502. The network 503 may include the AN 301 and/or the CN 305. For example, the network 503 may include the AN 301 including a base station (e.g., eNB or gNB) and/or the CN 305 including a virtualized network entity (e.g., the AMF 312 and the SMF 314).

According to an embodiment of the disclosure, the user equipment 500 may correspond to the electronic device 101 in FIG. 1. The network 503 may correspond to the first network 198 or the second network 199 in FIG. 1.

According to an embodiment of the disclosure, the application processor 501 of the user equipment 500 may execute an application in operation 511. For example, the application processor 501 may execute an application in response to a user input (e.g., a touch input to a display of the user equipment 500). As another example, the application processor 501 may execute an application in response to reception of a signal from an external device (e.g., another user equipment or a base station).

According to an embodiment of the disclosure, the application processor 501 may transmit configuration information of the application to the communication processor 502 in operation 512. For example, the configuration information of the application may include information on a traffic descriptor (TD) corresponding to the application, a data network name (DNN), and/or an application identifier (e.g., the identification (ID) or name of the application). As another example, the configuration information of the application may include information on a service type and/or a service quality required for executing the application.

According to an embodiment of the disclosure, the communication processor 502 may determine an URSP rule mapped to the application in operation 513. For example, a plurality of URSP rules may be stored in the memory 130 of the user equipment 500. The communication processor 502 may determine the URSP rule mapped to the executed application among the plurality of URSP rules, based on the configuration information of the executed application. As another example, when plurality of URSP rules are required to be identified, the user equipment 500 may obtain the plurality of URSP rules from an external server.

According to an embodiment of the disclosure, a URSP rule may include various types of indicators and/or components. For example, a URSP rule may include a precedence value indicating priority among a plurality of URSP rules. For example, a URSP rule may include TDs corresponding to applications. For example, a URSP rule may include a route selection descriptor (RSD).

According to an embodiment of the disclosure, a TD included in a URSP rule may include various components. For example, a URSP rule may include information on a match-all TD applicable commonly to a plurality of applications that are executed in the user equipment 500. For example, a URSP rule may include at least one application identifier. For example, a URSP rule may include tuples of an Internet protocol (IP). In an example, tuples of an IP may include a destination IP address, a destination port number, and/or information on a protocol used in the IP.

According to an embodiment of the disclosure, an RSD included in a URSP rule may include various components. For example, an RSD included in a URSP rule may include at least one single-network slice selection assistance information (S-NSSAI). For example, an RSD included in a URSP rule may include information on the type of a packet data unit (PDU) session. For example, an RSD may include information on a preferred access type.

According to an embodiment of the disclosure, a URSP rule may be used to determine whether the executed application is to use a pre-established PDU session or establish a new PDU session in the user equipment 500. For example, a URSP rule may correspond to information for mapping designated user data traffic (e.g., application) to PDU session connection parameters.

According to an embodiment of the disclosure, the user equipment 500 may determine a URSP rule mapped to an executed application among a plurality of URSP rules, which are stored in the user equipment 500 or are preconfigured, based on TDs of the plurality of URSP rules and configuration information of the application. When there are plurality of URSP rules mapped to the executed application, the user equipment 500 may determine a URSP rule mapped to the executed application, based on precedence values of the URSP rules.

According to an embodiment of the disclosure, the user equipment 500 may establish a PDU session associated with the executed application, based on an RSD of the determined URSP rule in operation 514. For example, the user equipment 500 may establish a PDU session with a slice instance (e.g., the slice instance 1 in FIG. 4) of the network 503 by using an NSSAI of the RSD of the determined URSP rule.

According to an embodiment of the disclosure, when the user equipment 500 has failed to determine a URSP rule mapped to the executed application, the user equipment 500 may establish a PDU session associated with the executed application according to a default URSP rule including a match-all TD. In an embodiment of the disclosure, establishing a PDU session may be understood as establishing a user plane connection between the user equipment 500 and a designated data network (DN). As another example, establishing a PDU session may be understood as establishing a communication channel for data communication between the user equipment 500 and the network 503.

According to an embodiment of the disclosure, when it is unable to establish a PDU session according to a default URSP rule, the user equipment 500 may notify the network 503 of failure of PDU session establishment. As another example, when it is unable to establish a PDU session according to a default URSP rule, the user equipment 500 may notify an upper layer of software layers in the user equipment 500 of failure of PDU session establishment. For example, when it is unable to establish a PDU session according to a default URSP rule, the user equipment 500 may notify the middleware 144 in FIG. 1 or the operating system 142 in FIG. 1 of failure of PDU session establishment.

In the disclosure, operation 511 to operation 513 are described as being performed by the application processor 501 and the communication processor 502 in the user equipment 500, but this merely corresponds to an example. Operation 511 to operation 513 in the disclosure may be described as being performed by the application processor 501 or being performed by the communication processor 502.

The term "processor" (e.g., the application processor or the communication processor) in the disclosure may be replaced with a term indicating a component that performs data processing. For example, a processor may be replaced with a controller.

Figure 6:
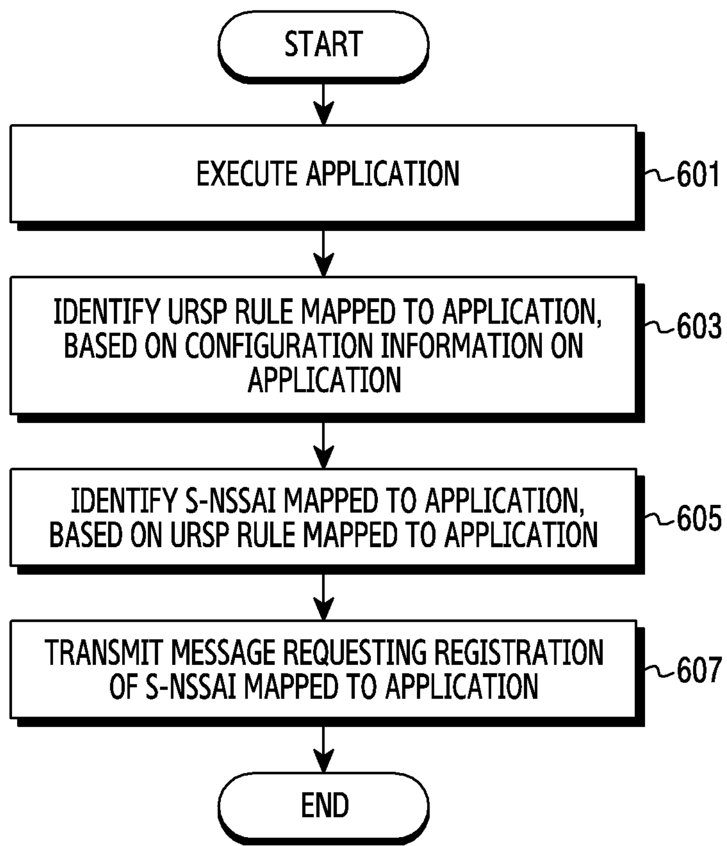
FIG. 6 is a diagram illustrating a method of requesting registration of a network slice selection assistance information (S-NSSAI) mapped to an application according to an embodiment of the disclosure.

FIG. 6 is a diagram illustrating a method of requesting registration of an S-NSSAI mapped to an application according to an embodiment of the disclosure.

Referring to FIG. 6, the user equipment 500 according to an embodiment may execute an application in operation 601. For example, the application processor 501 of the user equipment 500 may execute an application in response to a designated input. For example, the designated input may correspond to a touch input from a user to a display of the user equipment 500, or data transmission from an external electronic device (e.g., a base station or another user equipment) to the user equipment 500.

According to an embodiment of the disclosure, the user equipment 500 may identify a URSP rule mapped to the application, based on configuration information on the application in operation 603. For example, the user equipment 500 may identify a URSP rule including a TD mapped to the application among a plurality of URSP rules stored in the memory 130. In an example, each of the plurality of URSP rules may correspond to a non-default URSP rule. For example, when a URSP rule mapped to the application is identified, the user equipment 500 may identify the URSP rule mapped to the application among non-default URSP rules.

According to an embodiment of the disclosure, URSP rules may be classified as a non-default URSP rule and a default URSP rule. For example, a default URSP rule may be referenced as a URSP rule including a match-all parameter applied commonly to all applications that are executed in the user equipment 500. For example, a non-default URSP rule may be referenced as a URSP rule for mapping one or a designated number of applications to a PDU session. As another example, a non-default URSP rule may be referenced as a URSP rule other than default URSP rules among a plurality of URSP rules.

According to an embodiment of the disclosure, the user equipment 500 may identify an S-NSSAI mapped to the application, based on the URSP rule mapped to the application in operation 605. For example, the user equipment 500 may identify a route selection descriptor (RSD) of a URSP rule including a TD mapped to the application, and determine whether there is a PDU session mapped to the identified RSD among a plurality of PDU sessions in which connection are established. In an example, when there is no PDU session mapped to the identified RSD among a plurality of PDU sessions, the user equipment 500 may identify an S-NSSAI mapped to the application.

For example, the user equipment may identify a plurality of RSDs included in the URSP rule mapped to the application, and identify an RSD mapped to the application among the plurality of RSDs, based on the configuration information of the application. In an example, the user equipment 500 may identify an S-NSSAI of the RSD mapped to the application as an S-NSSAI mapped to the application.

According to an embodiment of the disclosure, an operation of identifying the S-NSSAI in operation 605 may be understood substantially as an operation of identifying an S-NSSAI list. For example, the user equipment 500 may identify an S-NSSAI list mapped to the application, and the S-NSSAI list may include an S-NSSAI mapped to the application.

According to an embodiment of the disclosure, after performing operation 605, the user equipment 500 may determine whether the NSSAI mapped to the application is included in NSSAIs allowed by the CN 305 to be registered. For example, the user equipment 500 may transmit, to the CN 305, a message requesting to allow registration of NSSAIs included in a first list before performing operation 601. The user equipment 500 may receive, from the CN 305 via the base station, a message indicating that at least some of the NSSAIs included in the first list are allowed to be registered. In an example, the user equipment 500 may determine whether the NSSAI mapped to the application is included in the at least some NSSAIs allowed to be registered among the NSSAIs included in the first list. In an embodiment of the disclosure, when it is determined that the NSSAI mapped to the application is not included in NSSAIs allowed by the CN 305 to be registered, the user equipment may perform operation 607.

According to an embodiment of the disclosure, the user equipment 500 may transmit a message requesting registration of the S-NSSAI mapped to the application in operation 607. For example, the user equipment 500 may generate a second list including the S-NSSAI mapped to the application. The user equipment 500 may transmit, to the CN 305, a request to allow registration of NSSAIs included in the second list. In an embodiment of the disclosure, a procedure of registering the S-NSSAI mapped to the application may be initiated by the user equipment 500 transmitting a message requesting registration of the S-NSSAI mapped to the application.

An operation of the user equipment 500 of the disclosure may be understood as being performed by substantially at least one processor (e.g., the application processor 501 and/or the communication processor 502) included in the user equipment 500.

The term "identify", "determine", or "check" in the disclosure may be replaced interchangeably. For example, an operation of identifying the URSP rule mapped to the application in operation 603 may be replaced with an operation of determining the URSP rule mapped to the application.

The term "mapped to (with)" in the disclosure may be replaced with "corresponding to".

Operation 601 in FIG. 6 of the disclosure may correspond to operation 511 in FIG. 5, and operation 603 in FIG. 6 may correspond to operation 513 in FIG. 5. Therefore, the embodiment of FIG. 6 in the disclosure may be combined with the embodiment of FIG. 5. However, the relation of correspondence between operations in FIG. 5 and operations in FIG. 6 merely corresponds to an example, and is not limited to an example described above.

Figure 7:
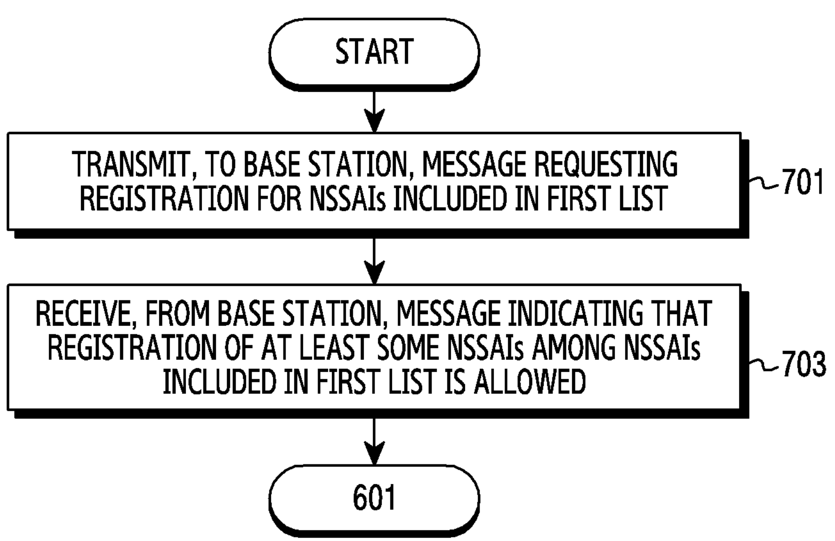
FIG. 7 is a diagram illustrating a method of requesting a core network (CN) to register NSSAIs included in a first list according to an embodiment of the disclosure.

FIG. 7 is a diagram illustrating a method of requesting a CN to register NSSAIs included in a first list according to an embodiment of the disclosure.

Referring to FIG. 7, in operation 701 according to an embodiment of the disclosure, the user equipment 500 may transmit, to the CN 305, a message requesting registration for NSSAIs included in a first list. For example, the user equipment 500 may identify NSSAIs corresponding to applications being executed or having been executed, transmit a first list including the identified NSSAIs to the CN 305 via the base station, and may request the CN 305 to allow registration of the NSSAIs included in the first list.

According to an embodiment of the disclosure, in operation 703, the user equipment 500 may receive, from the CN 305 via the base station, a message indicating that registration of at least some NSSAIs among the NSSAIs included in the first list is allowed. For example, the user equipment 500 may receive, from the CN 305, a message indicating that registration of all of the NSSAIs included in the first list is allowed. For example, the user equipment 500 may receive, from the CN 305, a message indicating that registration of some of the NSSAIs included in the first list is allowed.

According to an embodiment of the disclosure, the user equipment 500 may establish PDU sessions associated with at least some NSSAIs allowed to be registered. In an embodiment of the disclosure, the user equipment 500 may transmit or receive data required for executing applications by using the established PDU sessions. For example, the established PDU sessions may be referenced as a connection between the user equipment 500 and a network slice.

According to an embodiment of the disclosure, an S-NSSAI or an NSSAI used for identifying a network slice (e.g., slice instance 1 in FIG. 3) may be variously distinguished. For example, a NSSAI for which the user equipment has requested the CN 305 to allow registration may be referenced as a requested NSSAI. The CN 305 may determine an NSSAI, which is to be allowed to be registered, based on the requested NSSAI.

For example, an NSSAI allowed by the CN 305 to be registered among requested NSSAIs may be referenced as an allowed NSSAI. An allowed NSSAI may be designated (assigned) by the CN 305. In an example, an allowed NSSAI may be determined based on a registration area (RA) or a public land mobile network (PLMN) among requested NSSAIs. In an example, the number of allowed NSSAIs may be allowed up to a maximum number (e.g., 8) among requested NSSAIs (e.g., 16).

For example, an NSSAI which the user equipment 500 may request to the CN 305 may be pre-configured, and the pre-configured NSSAI may be referenced as a configured NSSAI. In an example, the number of configured NSSAIs may correspond to a designated number (e.g., 16).

For example, an NSSAI not allowed by the CN 305 to be registered among requested NSSAIs may be referenced as a rejected NSSAI. In an example, requested NSSAIs may be determined by the CN 305, based on a RA or a PLMN.

Operation 701 to operation 703 in FIG. 7 of the disclosure may be performed before operation 601 in FIG. 6. For example, after operation 701 to operation 703 in FIG. 7 are performed, operation 601 in FIG. 6 may be performed. Therefore, the embodiment of FIG. 6 and the embodiment of FIG. 7 may be combined with each other. However, the sequence in which the operations are performed is merely an example, and the sequence in which the operations are performed are not limited to the sequence described above.

Figure 8:
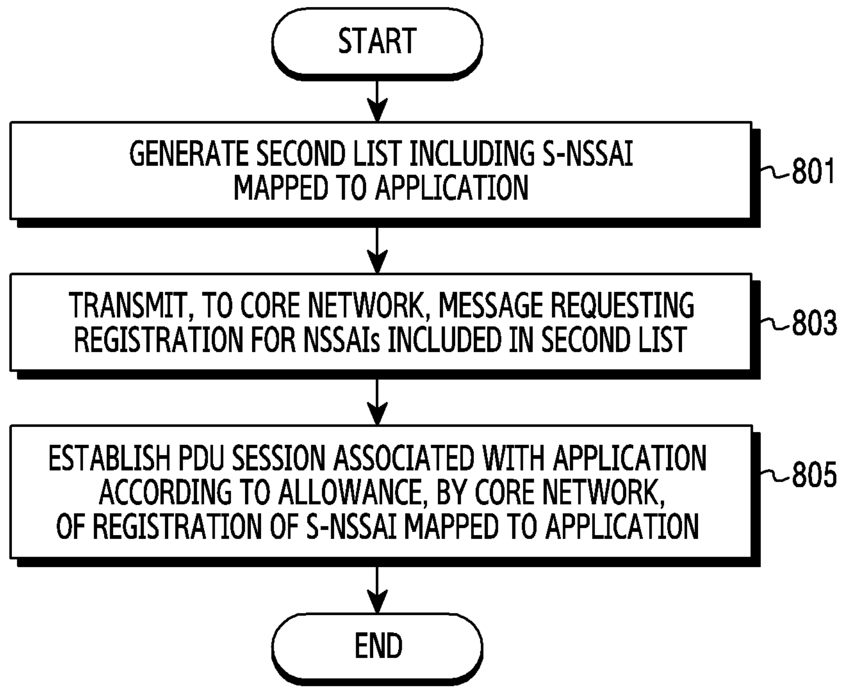
FIG. 8 is a diagram illustrating a method of requesting a CN to register NSSAIs included in a second list according to an embodiment of the disclosure.

FIG. 8 is a diagram illustrating a method of requesting a CN to register NSSAIs included in a second list according to an embodiment of the disclosure.

Referring to FIG. 8, in operation 801 according to an embodiment of the disclosure, the user equipment 500 may generate a second list including an S-NSSAI mapped to an application. For example, the user equipment 500 may identify the S-NSSAI mapped to the application, and generate a second list including the S-NSSAI mapped to the application. For example, the second list may include the S-NSSAI mapped to the application and/or S-NSSAIs corresponding to different applications, respectively.

According to an embodiment of the disclosure, in operation 803, the user equipment 500 may transmit, to a core network (e.g., the CN 305), a message requesting registration for NSSAIs included in the second list. For example, the user equipment 500 may transmit a message requesting registration to the CN 305 via the base station.

According to an embodiment of the disclosure, in operation 805, the user equipment 500 may establish a PDU session associated with the application according to allowance, by the core network (e.g., the CN 305), of registration of the S-NSSAI mapped to the application. In an embodiment of the disclosure, the user equipment 500 may transmit or receive data associated with the application to or from a network (e.g., the network 503 in FIG. 5) by using the established PDU session.

Operation 801 in FIG. 8 of the disclosure may be performed between operation 605 and operation 607 in FIG. 6. Operation 803 in FIG. 8 may correspond to operation 607 in FIG. 6. Therefore, the embodiment of FIG. 8 and the embodiment of FIG. 6 may be combined with each other. However, the sequence in which the operations are performed and the relation of correspondence between the operations merely correspond to an example, and the sequence between the operations and the relation of correspondence between the operations are not limited thereto.

Figure 9:
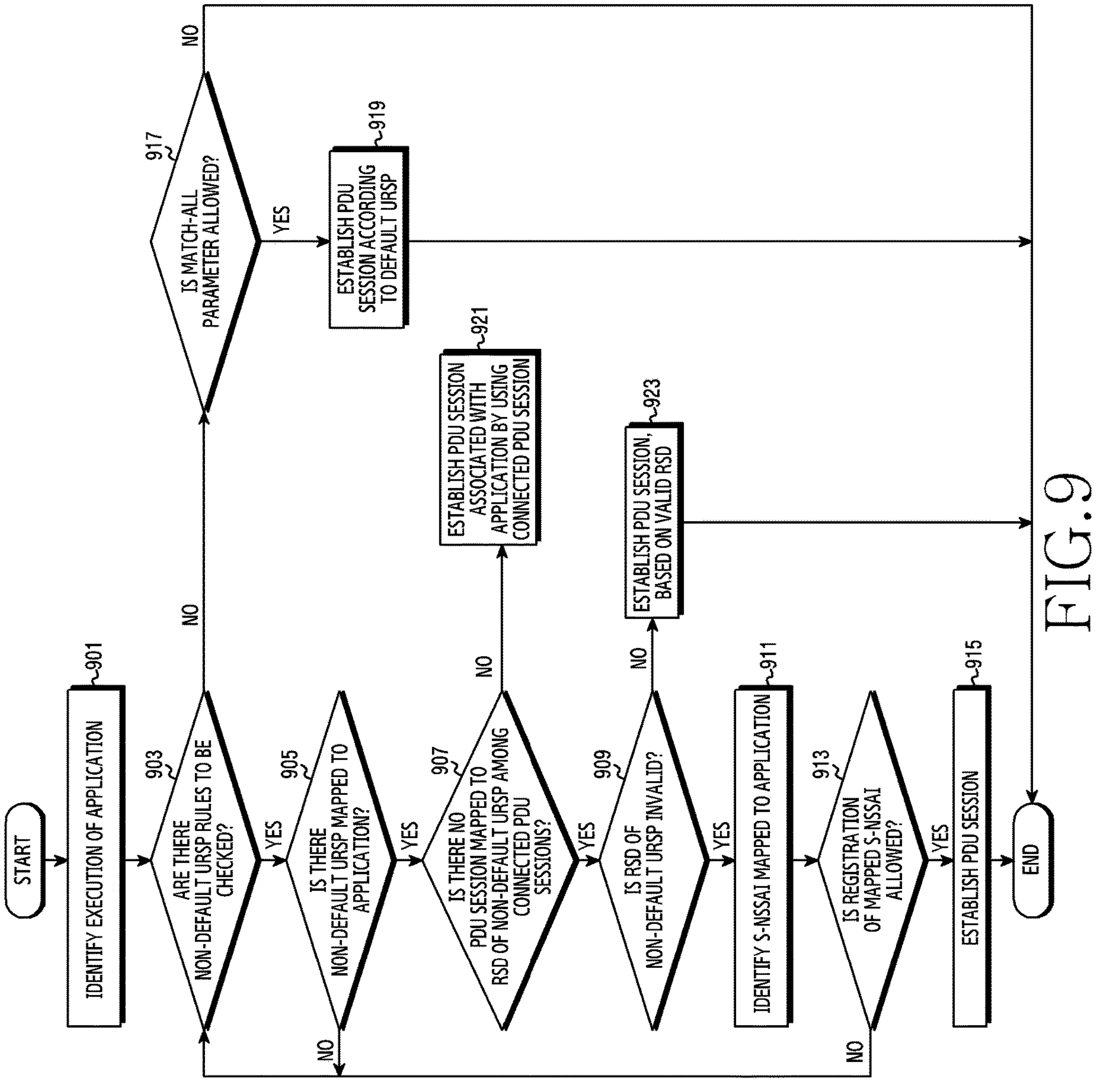
FIG. 9 is a diagram illustrating an operation of establishing a PDU session associated with an application according to an embodiment of the disclosure.

FIG. 9 is a diagram illustrating an operation of establishing a PDU session associated with an application according to an embodiment of the disclosure.

Referring to FIG. 9, in operation 901 according to an embodiment of the disclosure, the user equipment 500 may identify execution of an application.

According to an embodiment of the disclosure, in operation 903, the user equipment 500 may determine whether there are non-default URSP rules to be checked. For example, the user equipment 500 may identify non-default URSP rules other than a default URSP rule among a plurality of URSP rules stored in the memory 130.

According to an embodiment of the disclosure, when non-default URSP rules to be checked do not exist, in operation 917, the user equipment 500 may determine whether a match-all parameter is allowed. For example, when there are no non-default URSP rules to be checked as whether they are mapped to the application, among non-default URSP rules stored in the memory 130, the user equipment 500 may determine whether using a match-all parameter of a default URSP rule is allowed. In an embodiment of the disclosure, when a match-all parameter of a default URSP rule is allowed, the user equipment 500 may establish a PDU session, based on the default URSP rule.

According to an embodiment of the disclosure, a match-all parameter of the default URSP rule may be referenced as a parameter applicable commonly to a plurality of applications executed in the user equipment 500.

According to an embodiment of the disclosure, when non-default URSP rules to be checked exist, in operation 905, the user equipment 500 may determine whether there is a non-default URSP rule mapped to the application. For example, the user equipment 500 may identify a non-default URSP rule including a TD mapped to the application among non-default URSP rules, based on configuration information of the application. In an example, the user equipment 500 may determine a non-default URSP rule including a TD mapped to the application as a non-default URSP rule corresponding to the application.

According to an embodiment of the disclosure, when there are a plurality of non-default URSP rules including a TD mapped to the application, the user equipment 500 may determine a non-default URSP rule mapped to the application according to priority.

According to an embodiment of the disclosure, when there is a non-default URSP rule mapped to the application, the user equipment 500 may determine whether there is a PDU session mapped to an RSD of the non-default URSP rule among connected PDU sessions in operation 907. For example, the user equipment 500 may identify PDU sessions having already been connected, and identify an RSD of the non-default URSP rule mapped to the application. In an example, the user equipment may determine whether there is a PDU session mapped to the identified RSD among the PDU sessions having already been connected.

According to an embodiment of the disclosure, when there is a PDU session mapped to the identified RSD among the connected PDU sessions, the user equipment 500 may establish a PDU session associated with the application by using the mapped PDU session in operation 921. For example, when there is a PDU session mapped to the RSD among the connected PDU sessions, the user equipment 500 may not be required to additionally request the CN 305 to register a NSSAI mapped to the application.

According to an embodiment of the disclosure, when there is a PDU session mapped to the identified RSD among the connected PDU sessions, the user equipment 500 may determine whether the RSD of the non-default URSP rule is invalid, in operation 909. In an embodiment of the disclosure, an operation of determining whether the RSD of the non-default URSP rule is invalid may be substantially referenced as an operation of determining whether an NSSAI of the RSD corresponds to an NSSAI allowed by the CN 305 to be registered. For example, a NSSAI not allowed to be registered may be an invalid NSSAI, and a NSSAI allowed to be registered may be a valid NSSAI.

For example, the user equipment 500 may identify an RSD of the non-default URSP rule, and may determine whether a NSSAI of the RSD is included in NSSAIs previously allowed by the CN 305 to be registered, thereby determining whether the NSSAI of the RSD is invalid. For example, the user equipment 500 may transmit, to the CN 305 via the base station, a first list including NSSAIs required to be registered, before operation 901, and may receive, from the CN 305, a message indicating that registration of at least a part of the first list has been allowed. In an example, the user equipment 500 may determine whether the NSSAI associated with the RSD of the non-default URSP rule is included in the at least a part of the first list allowed to be registered, thereby determining the NSSAI is invalid.

According to an embodiment of the disclosure, when the RSD of the non-default URSP rule is valid, the user equipment 500 may establish a PDU session, based on the valid RSD in operation 923. For example, the user equipment 500 may establish a PDU session associated with a NSSAI of the valid RSD. In an example, the NSSAI of the valid RSD may be an NSSAI for which a connection has not been established but registration is allowed by the CN 305.

According to an embodiment of the disclosure, when the RSD of the non-default URSP rule is invalid, in operation 911, the user equipment 500 may identify an S-NSSAI mapped to the application. For example, when the RSD of the non-default URSP rule is not included in NSSAIs allowed by the CN 305 to be registered, the user equipment 500 may identify an S-NSSAI of the RSD of the non-default URSP rule.

According to an embodiment of the disclosure, the user equipment 500 may determine whether registration of the S-NSSAI mapped to the application is allowed, in operation 913. For example, the user equipment 500 may transmit, to the CN 305 via the base station, a message requesting to allow registration of the S-NSSAI mapped to the application. In an example, the user equipment 500 may receive, from the CN 305, a message indicating that registration of the S-NSSAI is allowed, or receive, from the CN 305, a message indicating that registration of the S-NSSAI is not allowed. In an embodiment of the disclosure, the user equipment 500 may determine whether registration of the S-NSSAI mapped to the application is allowed, based on the message received from the base station.

According to an embodiment of the disclosure, when registration of the S-NSSAI mapped to the application is allowed, the user equipment 500 may establish a PDU session in operation 915. For example, the user equipment 500 may establish a PDU session associated with the S-NSSAI mapped to the application.

Operation 905 in FIG. 9 of the disclosure may correspond to operation 603 in FIG. 6, and operation 911 in FIG. 9 may correspond to operation 605 in FIG. 6. Therefore, the embodiment of FIG. 9 may be combined with the embodiment of FIG. 6. However, the relation of correspondence between the operations in FIG. 6 and the operations in FIG. 9 merely corresponds to an example, and the relation of correspondence between the operations may be various.

Figure 10:
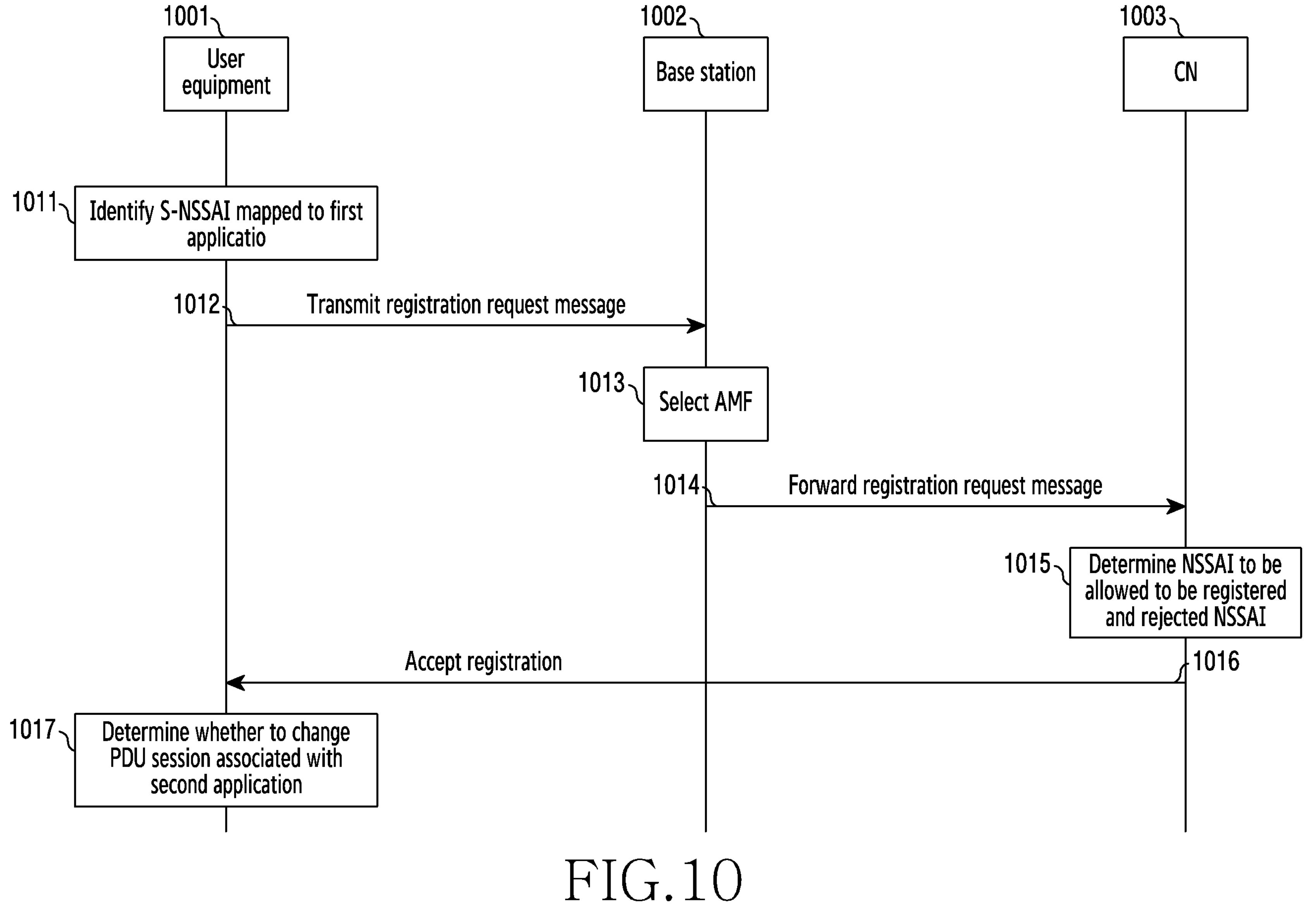
FIG. 10 is a diagram illustrating an operation in which a user equipment transmits a registration request to a CN and receives a message indicating that a registration is accepted according to an embodiment of the disclosure.

FIG. 10 is a diagram illustrating an operation in which a user equipment transmits a registration request to a CN and receives a message indicating that a registration is accepted according to an embodiment of the disclosure.

Referring to FIG. 10, a wireless communication system according to an embodiment may include a user equipment 1001, a base station 1002, and/or a core network (CN) 1003. The user equipment 1001 may correspond to the electronic device 101 in FIG. 1 and the user equipment 500 in FIG. 5. The base station 1002 may be included in the AN 301 in FIG. 3, and the CN 1003 may correspond to the CN 305 in FIG. 3.

According to an embodiment of the disclosure, the user equipment 1001 may identify an S-NSSAI mapped to a first application in operation 1011. For example, the user equipment 1001 may identify a URSP rule corresponding to the first application by using a TD, and determine whether an S-NSSAI of an RSD included in the URSP rule corresponds to an NSSAI allowed by the CN 305 to be registered.

According to an embodiment of the disclosure, the user equipment 1001 may transmit, to the base station 1002, a message requesting to allow registration of the S-NSSAI mapped to the first application in operation 1012. For example, the user equipment 1001 may transmit, to the base station 1002, a second list including the S-NSSAI mapped to the first application. The second list may include the S-NSSAI mapped to the first application and NSSAIs corresponding to different applications being executed in the user equipment 1001, respectively.

According to an embodiment of the disclosure, the base station 1002 may select an AMF (the AMF 312 in FIG. 3) included in a CN (e.g., the CN 305 in FIG. 3), based on a message (or a registration request message) requesting registration of the S-NSSAI in operation 1013.

According to an embodiment of the disclosure, the base station 1002 may forward or transmit the received registration request message to the CN 1003 in operation 1014.

According to an embodiment of the disclosure, the CN 1003 may determine an NSSAI to be allowed to be registered and an NSSAI to be rejected to be registered among S-NSSAIs included in the second list, based on information included in the registration request message in operation 1015. For example, the information included in the registration request message may include NSSAIs requested to be registered, an S-NSSAI supportable by the selected AMF 312, information (e.g., subscriber information) of the user equipment 500 stored in the CN 305, and/or location information (e.g., registration area (RA)) of the user equipment 500.

According to an embodiment of the disclosure, the CN 1003 may transmit a registration accept message to the user equipment 1001 via the base station 1002. For example, the CN 1003 may transmit, to the user equipment 1001, information on an S-NSSAI allowed to be registered among the S-NSSAIs included in the second list, and/or information on an S-NSSAI rejected to be registered among the S-NSSAIs included in the second list. As another example, the CN 1003 may transmit a registration accept message to the user equipment 1001. As another example, the CN 1003 may transmit, to the user equipment 1001, a message indicating that at least a part of the second list is allowed to be registered. NSSAIs allowed to be registered in the second list may include the S-NSSAI corresponding to the first application.

According to an embodiment of the disclosure, the user equipment 1001 may establish a PDU session by using an S-NSSAI allowed to be registered.

According to an embodiment of the disclosure, the user equipment 1001 may determine whether to change a PDU session associated with a second application in operation 1017. For example, the CN 305 newly notifies of NSSAIs allowed to be registered in operation 1016, whereby some of NSSAIs previously allowed to be registered may be excluded from the NSSAIs allowed to be registered. For example, when IDs of NSSAIs previously allowed to be registered are 1, 2, 3, 4, and 5, in operation 1016, NSSAIs newly notified of by the CN 305 in operation 1016 and allowed to be registered may be NSSAI 1, NSSAI 2, NSSAI 3, NSSAI 4, and NSSAI 6. Therefore, connection of a PDU session associated with an NSSAI having an NSSAI ID of NSSAI 5 may be released. In this case, applications have been transmitting or receiving data through the PDU session, the connection of which has been released, may be required to transmit or receive data through a different PDU session.

Consequently, the user equipment 1001 may change a PDU session of an application (e.g., the second application) having been transmitting or receiving data through the PDU session, the connection of which has been released. For example, the user equipment 1001 may change the PDU session of the second application to a PDU session having one PDU session ID among 1, 2, 3, 4, and 6. The user equipment 1001 may receive or transmit data associated with the second application through the changed PDU session.

Operation 1011 in FIG. 10 of the disclosure may correspond to operation 605 in FIG. 6, and operation 1012 in FIG. 10 may correspond to operation 607 in FIG. 6. Therefore, the embodiment of FIG. 6 and the embodiment of FIG. 10 may be combined with each other. However, the relation of correspondence between the operations described above merely correspond to an example, and various relations of correspondence between the operations are not limited thereto.

Figure 11:
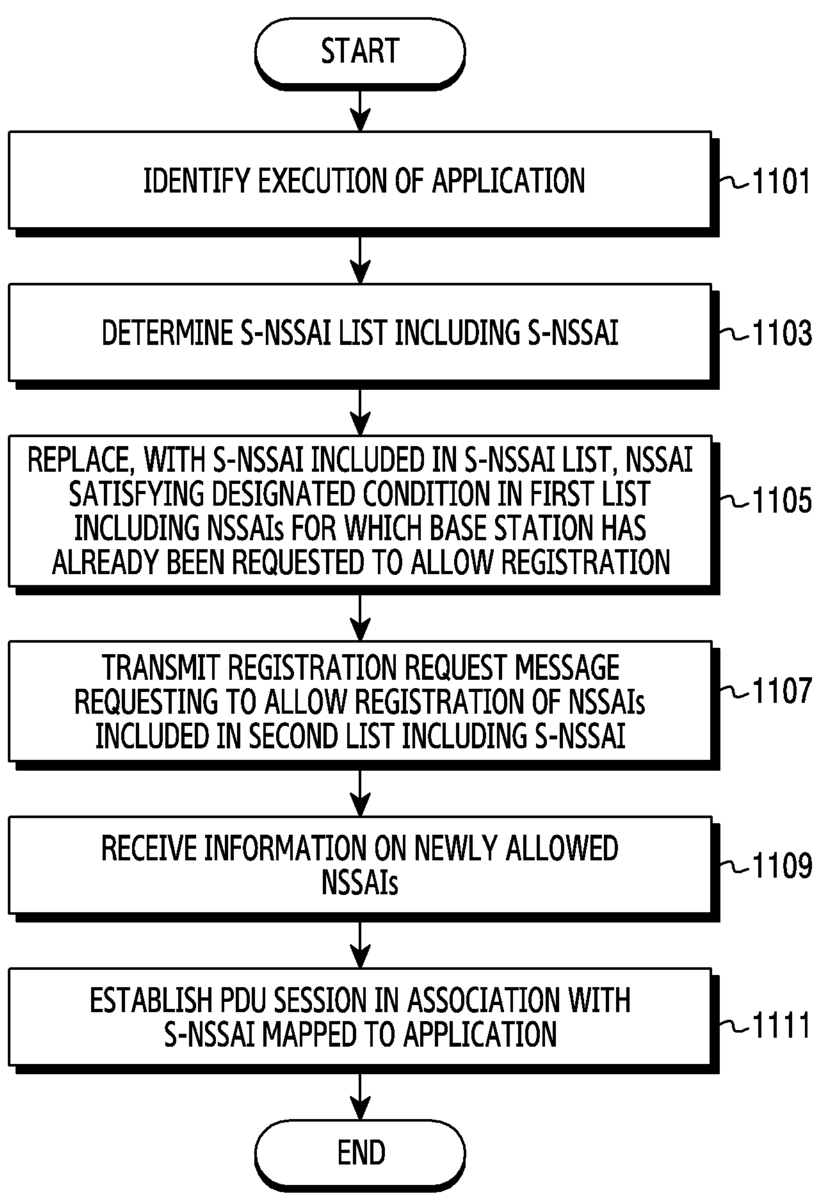
FIG. 11 is a diagram illustrating a method in which registration of an NSSAI satisfying a designated condition is allowed according to an embodiment of the disclosure.

FIG. 11 is a diagram illustrating a method in which registration of an NSSAI satisfying a designated condition is allowed according to an embodiment of the disclosure.

Referring to FIG. 11, in operation 1101 according to an embodiment of the disclosure, the user equipment 500 may identify execution of an application. For example, the application processor 501 of the user equipment 500 may execute an application.

According to an embodiment of the disclosure, in operation 1103, the user equipment 500 may determine an S-NSSAI list including an S-NSSAI. For example, the user equipment 500 may determine a URSP rule corresponding to the application by using a TD, and when an RSD of the determined URSP rule is invalid, may determine an S-NSSAI list including an S-NSSAI corresponding to the application. For example, the S-NSSAI list may include an ID of the S-NSSAI corresponding to the application.

According to an embodiment of the disclosure, in operation 1105, the user equipment 500 may replace or change, with or to an S-NSSAI included in the S-NSSAI list, an NSSAI satisfying a designated condition in a first list including NSSAIs for which the CN 305 has already been requested to allow registration. A list including the replaced S-NSSAI may be referenced as a second list.

For example, the first list may include NSSAI 1, NSSAI 2, NSSAI 3, NSSAI 4, and NSSAI 5 as IDs of NSSAIs. The user equipment 500 may exclude NSSAI 5 satisfying a designated condition among NSSAI 1, NSSAI 2, NSSAI 3, NSSAI 4, and NSSAI 5, and may add NSSAI 6. Consequently, the user equipment 500 may generate a second list including NSSAI 1, NSSAI 2, NSSAI 3, NSSAI 4, and NSSAI 6.

According to an embodiment of the disclosure, the designated condition may include a condition that the NSSAI is an NSSAI having been previously requested but not allowed by the CN 305, a condition that the NSSAI is an NSSAI having been allowed by the CN 305 but having no relevant PDU session established, and/or a condition that allowance has been made by the CN 305 and a PDU session has been established, but a priority is lowest. A method of replacing a NSSAI corresponding to a designated condition will be described in detail with reference to FIG. 12.

According to an embodiment of the disclosure, in operation 1107, the user equipment 500 may transmit, to the CN 305, a registration request message requesting to allow registration of NSSAIs included in the second list including the S-NSSAI corresponding to the application. In an embodiment of the disclosure, the CN 305 may transmit, to the user equipment 500, a message indicating that registration of at least some of the NSSAIs included in the second list is allowed, in response to reception of the registration request message. The allowed at least some NSSAIs may include the S-NSSAI corresponding to the application.

According to an embodiment of the disclosure, in operation 1109, the user equipment 500 may receive information on newly allowed NSSAIs. For example, the user equipment 500 may receive, from the CN 305, information on at least some allowed NSSAIs.

According to an embodiment of the disclosure, in operation 1111, the user equipment 500 may establish a PDU session associated with the S-NSSAI mapped to the application. For example, the user equipment 500 may establish a PDU session by using the S-NSSAI according to allowance, by the CN 305, of registration of the S-NSSAI mapped to the application. In an embodiment of the disclosure, the user equipment 500 may transmit and/or receive data associated with the application through the established PDU session.

Operation 1103 in FIG. 11 of the disclosure may substantially correspond to operation 605 in FIG. 6. Operation 1107 in FIG. 11 of the disclosure may substantially correspond to operation 607 in FIG. 6. Therefore, the embodiment of FIG. 11 may be combined with the embodiment of FIG. 6. However, the relation of correspondence between the operations described above merely corresponds to an example. The operations may have various correspondence relations, and are not limited thereto.

Figure 12:
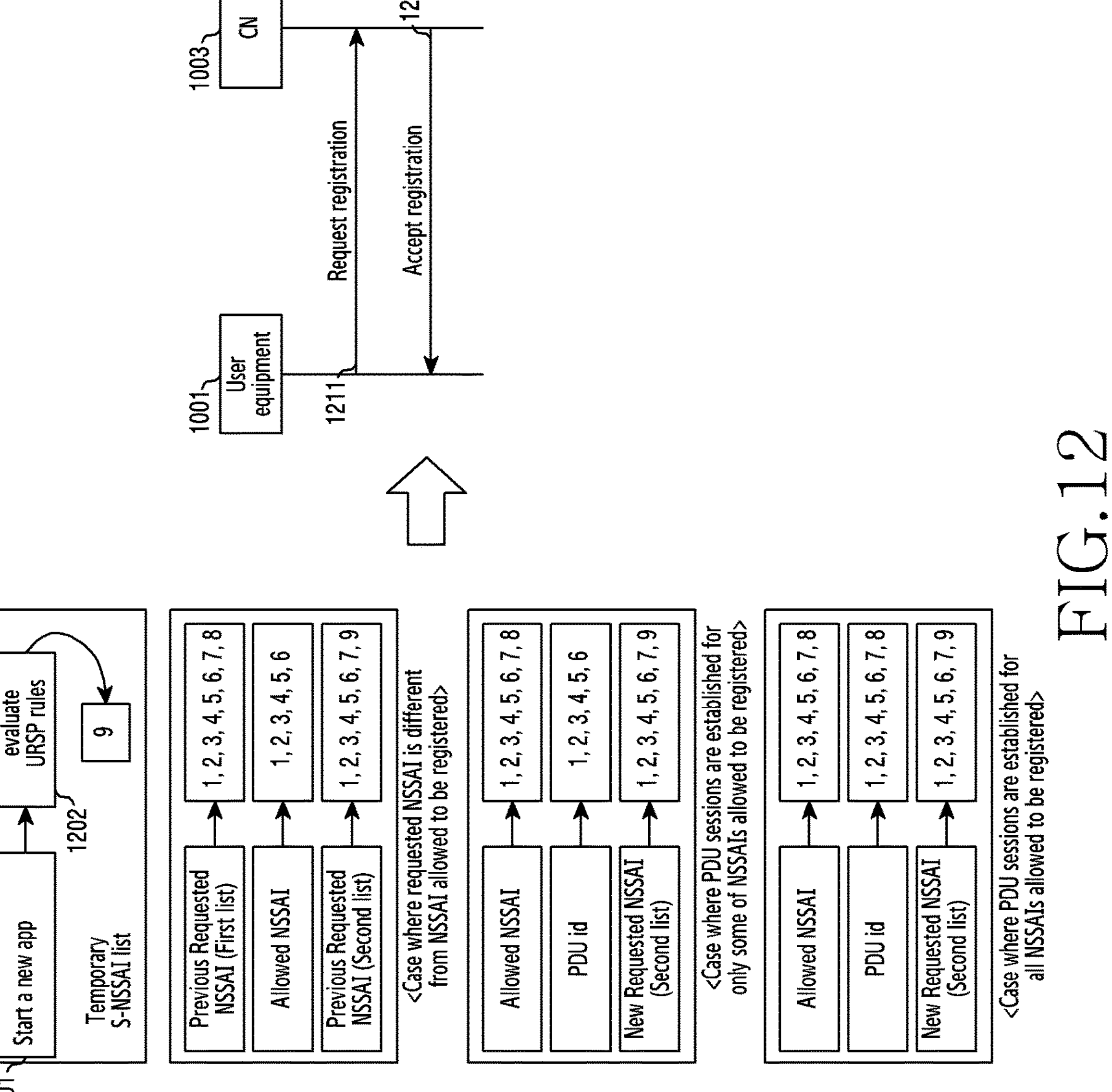
FIG. 12 is a diagram illustrating a method in which an NSSAI satisfying a designated condition is replaced with an S-NSSAI corresponding to an application according to an embodiment of the disclosure.

FIG. 12 is a diagram illustrating a method in which an NSSAI satisfying a designated condition is replaced with or changed to an S-NSSAI corresponding to an application according to an embodiment of the disclosure.

Referring to FIG. 12, the user equipment 500 according to an embodiment may start a new application in operation 1201, and evaluate URSP rules in operation 1202. In an embodiment of the disclosure, the user equipment 500 may evaluate URSP rules to identify an S-NSSAI included in an S-NSSAI list. For example, the identified S-NSSAI may be S-NSSAI 9.

According to an embodiment of the disclosure, an operation of evaluating the URSP rules may also be substantially referenced as an operation of determining whether there is a URSP rule mapped to a newly executed application.

Referring to a case (hereinafter, case 1) in which NSSAIs for which the CN 305 has been previously requested to allow registration are different from NSSAIs having been allowed to be registered according to an embodiment of the disclosure, a first list having been previously transmitted to the CN 305 may include NSSAI 1, NSSAI 2, NSSAI 3, NSSAI 4, NSSAI 5, NSSAI 6, NSSAI 7, and NSSAI 8. NSSAIs having been allowed by the CN 305 among the NSSAIs included in the first list may be NSSAI 1, NSSAI 2, NSSAI 3, NSSAI 4, NSSAI 5, and NSSAI 6.

According to an embodiment of the disclosure, the user equipment 500 may replace or change an NSSAI satisfying a designated condition among the NSSAIs included in the first list, with or to an S-NSSAI mapped to the application. In case 1, the designated condition may be a condition that at least one S-NSSAI included in the first list is an NSSAI (or requested NSSAI) for which the user equipment 500 has previously requested the CN 1003 to allow registration, and an NSSAI (or allowed NSSAI) for which the CN 1003 has not allowed the registration. For example, in case 1, the user equipment 500 may replace or change one of NSSAIs (e.g., NSSAI 7 and NSSAI 8) having not been allowed to be registered among the NSSAIs included in the first list, with or to an S-NSSAI (e.g., NSSAI 9) mapped to the application. Consequently, a second list may include the S-NSSAI (e.g., NSSAI 9) mapped to the application. For example, the second list may include NSSAI 1, NSSAI 2, NSSAI 3, NSSAI 4, NSSAI 5, NSSAI 6, NSSAI 8, and NSSAI 9. As another example, the second list may include NSSAI 1, NSSAI 2, NSSAI 3, NSSAI 4, NSSAI 5, NSSAI 6, NSSAI 7, and NSSAI 9.

According to an embodiment of the disclosure, the user equipment 500 may transmit the second list to the CN 1003 in operation 1211, and may request to allow registration of the NSSAIs included in the second list. In an embodiment of the disclosure, the CN 1003 may transmit, to the user equipment 500, a message indicating that registration of at least some of the NSSAIs included in the second list is allowed, in response to reception of a registration request message. For example, the at least some NSSAIs allowed to be registered may include NSSAI 9.

Referring to a case (hereinafter, case 2) in which all of previously requested NSSAIs have been allowed to be registered, but PDU sessions are established for only some of the NSSAIs having been allowed to be registered according to an embodiment of the disclosure, the NSSAIs having been allowed to be registered may include NSSAI 1, NSSAI 2, NSSAI 3, NSSAI 4, NSSAI 5, NSSAI 6, NSSAI 7, and NSSAI 8. NSSAIs for which PDU sessions are established among the NSSAIs having been allowed to be registered may include NSSAI 1, NSSAI 2, NSSAI 3, NSSAI 4, NSSAI 5, and NSSAI 6.

According to an embodiment of the disclosure, the user equipment 500 may replace or change an NSSAI satisfying a designated condition among the NSSAIs having been allowed to be registered, with or to an S-NSSAI mapped to the application. In case 2, the designated condition may be a condition that at least one among the NSSAIs having been allowed to be registered is an NSSAI for which a PDU connection is not established. For example, in case 2, the user equipment 500 may replace or change one of NSSAIs (e.g., NSSAI 7 and NSSAI 8) for which a PDU connection is not established among the NSSAIs having been allowed to be registered, with or to an S-NSSAI (e.g., NSSAI 9) mapped to the application. Consequently, a second list may include the S-NSSAI (e.g., NSSAI 9) mapped to the application. For example, the second list may include NSSAI 1, NSSAI 2, NSSAI 3, NSSAI 4, NSSAI 5, NSSAI 6, NSSAI 8, and NSSAI 9. As another example, the second list may include NSSAI 1, NSSAI 2, NSSAI 3, NSSAI 4, NSSAI 5, NSSAI 6, NSSAI 7, and NSSAI 9.

According to an embodiment of the disclosure, the user equipment 500 may transmit the second list to the CN 1003 in operation 1211, and may request to allow registration of the NSSAIs included in the second list. In an embodiment of the disclosure, the CN 1003 may transmit, to the user equipment 500, a message indicating that registration of at least some of the NSSAIs included in the second list is allowed, in response to reception of a registration request message. For example, the at least some NSSAIs allowed to be registered may include NSSAI 9.

Referring to a case (hereinafter, case 3) in which all of previously requested NSSAIs have been allowed to be registered, and PDU sessions are established for all the NSSAIs having been allowed to be registered according to an embodiment of the disclosure, the NSSAIs having been allowed to be registered may include NSSAI 1, NSSAI 2, NSSAI 3, NSSAI 4, NSSAI 5, NSSAI 6, NSSAI 7, NSSAI 8, and NSSAI 9. The NSSAIs for which the PDU sessions are established among the NSSAIs having been allowed to be registered may include NSSAI 1, NSSAI 2, NSSAI 3, NSSAI 4, NSSAI 5, NSSAI 6, NSSAI 7, NSSAI 8, and NSSAI 9.

According to an embodiment of the disclosure, the user equipment 500 may replace or change an NSSAI satisfying a designated condition among the NSSAIs having been allowed to be registered, with or to an S-NSSAI mapped to the application. In case 3, the designated condition may be a condition that there is a NSSAI having the lowest priority among the registered NSSAIs. For example, in case 3, the user equipment 500 may replace or change a NSSAI (e.g., NSSAI 8) having the lowest priority among the NSSAIs having been allowed to be registered, with or to an S-NSSAI (e.g., NSSAI 9) mapped to the application. Consequently, a second list may include the S-NSSAI (e.g., NSSAI 9) mapped to the application. For example, the second list may include NSSAI 1, NSSAI 2, NSSAI 3, NSSAI 4, NSSAI 5, NSSAI 6, NSSAI 7, and NSSAI 9.

According to an embodiment of the disclosure, the user equipment 500 may transmit the second list to the CN 1003 in operation 1012, and may request to allow registration of the NSSAIs included in the second list. In an embodiment of the disclosure, the CN 1003 may transmit, to the user equipment 500, a message indicating that registration of at least some of the NSSAIs included in the second list is allowed, in response to reception of a registration request message. For example, the at least some NSSAIs allowed to be registered may include NSSAI 9.

According to an embodiment of the disclosure, other applications associated with NSSAIs replaced or changed with or to an S-NSSAI mapped to an application may change PDU sessions.

Figure 13:
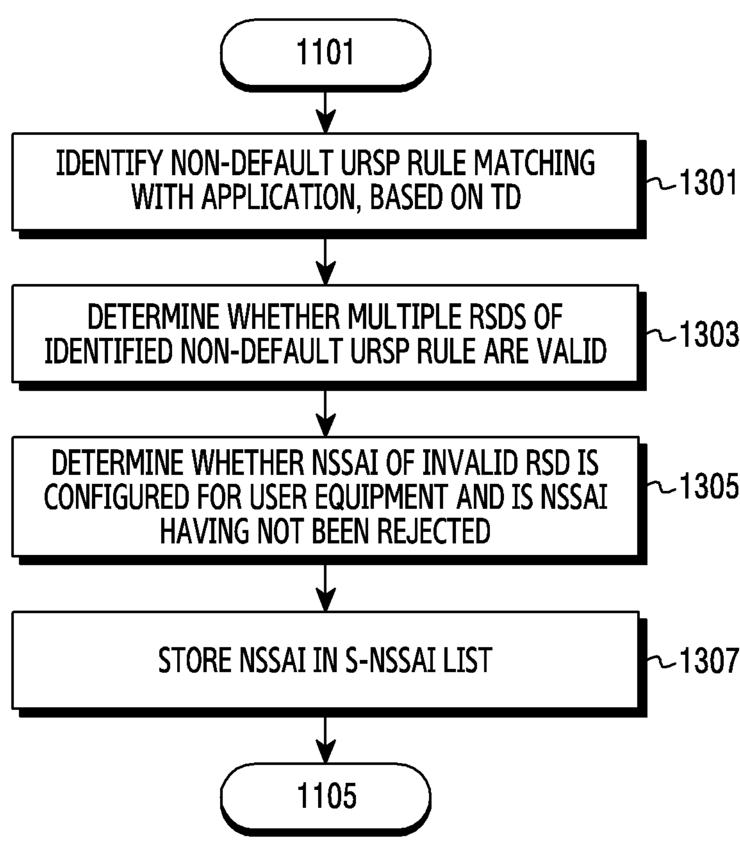
FIG. 13 is a diagram illustrating an operation of storing an S-NSSAI in an S-NSSAI list according to an embodiment of the disclosure.

FIG. 13 is a diagram illustrating an operation of storing an S-NSSAI in an S-NSSAI list according to an embodiment of the disclosure.

Referring to FIG. 13, the user equipment 500 according to an embodiment may identify a non-default URSP rule matching with an application, based on a TD in operation 1301. For example, the user equipment 500 may identify a TD mapping to an application, based on configuration information of the application, and identify a non-default URSP rule including the TD mapped to the application. According to an embodiment of the disclosure, when the user equipment 500 is unable to identify the non-default URSP rule matching with the application, the user equipment may identify whether there is a stored S-NSSAI list, and when there is the stored S-NSSAI list, may identify an S-NSSAI in the stored S-NSSAI list as a NSSAI mapped to the application.

According to an embodiment of the disclosure, in operation 1303, the user equipment 500 may determine or identify whether a plurality of RSDs of the identified non-default URSP rule are valid. For example, the non-default URSP rule may include a plurality of RSDs, and the user equipment 500 may determine or identify whether NSSAIs of the plurality of RSDs are NSSAIs allowed by the CN 305 to be registered. In an example, when a first NSSAI of a first RSD is allowed to be registered, the user equipment 500 may determine or identify that the first RSD is a valid RSD. When a second NSSAI of a second RSD is not allowed to be registered, the user equipment 500 may determine or identify that the second RSD is an invalid RSD.

According to an embodiment of the disclosure, in operation 1305, the user equipment 500 may determine or identify whether an NSSAI of an invalid RSD is configured for the user equipment and is an NSSAI having not been rejected. For example, the user equipment 500 may determine or identify whether an NSSAI of an RSD is included in NSSAIs configured for the user equipment 500. When the NSSAI of the RSD is included in the configured NSSAIs, the user equipment 500 may determine or identify whether the NSSAI of the RSD is an NSSAI having not been rejected by the CN 305. In an example, a rejected NSSAI may correspond to an NSSAI for which the CN 305 has been previously requested to allow registration, but the CN 305 has not allowed the registration.

According to an embodiment of the disclosure, when the NSSAI of the RSD is included in the NSSAIs configured for the user equipment 500 and is not a NSSAI having been rejected by the CN 305, the user equipment 500 may store the NSSAI of the RSD in an S-NSSAI list in operation 1307.

According to an embodiment of the disclosure, in a case where there are a plurality of URSP rules mapped to an application, and in a case where there are a plurality of RSDs mapped to an application, the user equipment may determine an S-NSSAI according to the priorities of the URSP rules and/or the priorities of the RSDs, respectively. For example, Table 1 shows S-NSSAIs having different priorities of URSP rules and different priorities of RSDs.

TABLE 1

| Mapped URSP rules | S-NSSAI ID | Priority of URSP rule | Priority of RSD |
|---|---|---|---|
| First URSP rule | S-NSSAI 9 | 1 | 1 |
| First URSP rule | S-NSSAI 10 | 1 | 2 |
| Second URSP rule | S-NSSAI 11 | 2 | 1 |

According to an embodiment of the disclosure, when a non-default rule matching an application is identified based on a TD, in a case where a plurality of URSP rules are identified, the user equipment 500 may identify one URSP rule according to the priorities of the URSP rules. For example, the user equipment 500 may identify a first URSP rule and/or a second URSP rule corresponding to an application, and the first URSP rule may have a higher priority than that of the second URSP rule. The user equipment 500 may determine the first URSP rule as a URSP rule mapped to the application. According to an embodiment of the disclosure, the user equipment 500 may identify a plurality of invalid RSDs among a plurality of RSDs included in the first URSP rule in operation 1303 to operation 1305. For example, the user equipment 500 may identify a first RSD and a second RSD which are invalid. In an example, the first RSD may include S-NSSAI 9, and the second RSD may include S-NSSAI 10.

According to an embodiment of the disclosure, the user equipment 500 may determine, as an RSD mapped to the application, an RSD having a relatively high priority among the plurality of identified RSDs, based on the priorities of the RSDs, and determine a NSSAI included in the RSD having the high priority as an S-NSSAI mapped to the application. For example, the priority of the first RSD is higher than that of the second RSD, the user equipment 500 may determine S-NSSAI 9, which is the NSSAI of the first RSD, as a S-NSSAI corresponding to the application.

Operation 1301 in FIG. 13 of the disclosure may correspond to operation 603 in FIG. 6, and operation 1307 in FIG. 13 of the disclosure may substantially correspond to operation 605 in FIG. 6. Therefore, operation 1303 to operation 1305 may be performed between operation 603 and operation 605. Consequently, the embodiment of FIG. 13 may be combined with the embodiment of FIG. 6. However, the relation of correspondence between the operations described above and the sequence in which the operations are performed merely correspond to an example, and the disclosure is not limited thereto.

Figure 14:
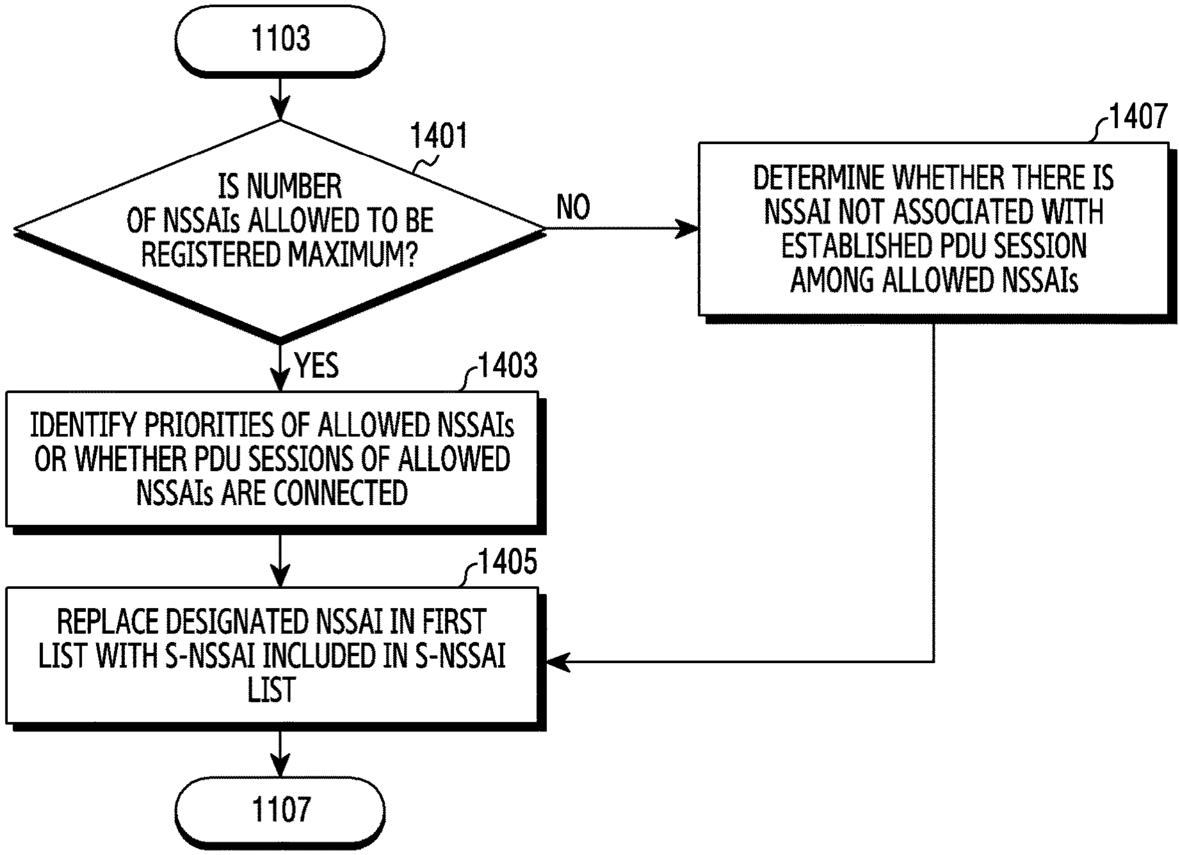
FIG. 14 is a diagram illustrating a method of replacing an NSSAI included in a first list with an S-NSSAI according to whether a number of NSSAIs allowed to be registered is a maximum number of registrable NSSAIs according to an embodiment of the disclosure.

FIG. 14 is a diagram illustrating a method of replacing or changing an NSSAI included in a first list with or to an S-NSSAI according to whether a number of NSSAIs allowed to be registered is a maximum number of registrable NSSAIs according to an embodiment of the disclosure.

Referring to FIG. 14, in operation 1401 according to an embodiment of the disclosure, the user equipment 500 may identify whether the number of NSSAIs allowed to be registered is maximum. For example, the number of NSSAIs for which the CN 305 is able to allow registration for the user equipment 500 may be a designated number (e.g., 8). The user equipment 500 may determine whether the number of NSSAIs for which the CN 305 has allowed registration is a maximum number of registrable NSSAIs (e.g., 8).

According to an embodiment of the disclosure, when the number of NSSAIs allowed to be registered is maximum, in operation 1403, the user equipment 500 may identify the priorities of the allowed NSSAIs or whether sessions of the allowed NSSAIs are connected. For example, when the number of NSSAIs allowed to be registered is 8 and a maximum number of registrable NSSAIs is 8, the user equipment 500 may identify the priorities of the allowed NSSAIs. For example, when the number of NSSAIs allowed to be registered is 8 and a maximum number of registrable NSSAIs is 8, the user equipment 500 may identify whether PDU sessions associated with the allowed NSSAIs are established.

According to an embodiment of the disclosure, the user equipment 500 may replace or change a designated NSSAI in a first list, with or to an S-NSSAI included in an S-NSSAI list in operation 1405. For example, the user equipment 500 may replace or change a NSSAI having the lowest priority among the NSSAIs allowed to be registered, with or to an S-NSSAI. For example, the user equipment 500 may generate a second list including remaining NSSAIs other than a NSSAI having the lowest priority among the NSSAIs allowed to be registered, and an S-NSSAI corresponding to an application. The example described above may correspond to case 2 of FIG. 12.

As another example, the user equipment 500 may replace, with an S-NSSAI, a NSSAI for which a PDU session is not established among the NSSAIs allowed to be registered. For example, the user equipment 500 may generate a second list including remaining NSSAIs other than a NSSAI for which a PDU session is not established among the NSSAIs allowed to be registered, and an S-NSSAI corresponding to an application. The example described above may correspond to case 3 of FIG. 12.

According to an embodiment of the disclosure, the first list may be referenced as a list including NSSAIs for which the user equipment 500 has previously requested the CN 305 to allow registration. In an embodiment of the disclosure, the S-NSSAI included in the S-NSSAI list may be an NSSAI corresponding to an application.

According to an embodiment of the disclosure, when the number of NSSAIs allowed to be registered is not maximum, in operation 1407, the user equipment 500 may determine or identify whether there is an NSSAI not associated with an established PDU session among the NSSAIs allowed to be registered. In an embodiment of the disclosure, when there is an NSSAI not associated with an established PDU session among the NSSAIs allowed to be registered, the user equipment 500 may replace or change a designated NSSAI in the first list, with or to an S-NSSAI included in the S-NSSAI list in operation 1405. For example, the user equipment 500 may replace or change an NSSAI not associated with an established PDU session in the first list, with or to an S-NSSAI included in the S-NSSAI list. For example, the user equipment 500 may generate a second list including remaining NSSAIs of the first list other than an NSSAI not associated with an established PDU session in the first list, and an S-NSSAI included in the S-NSSAI list. The example described above may correspond to case 1 of FIG. 12.

Figure 15:
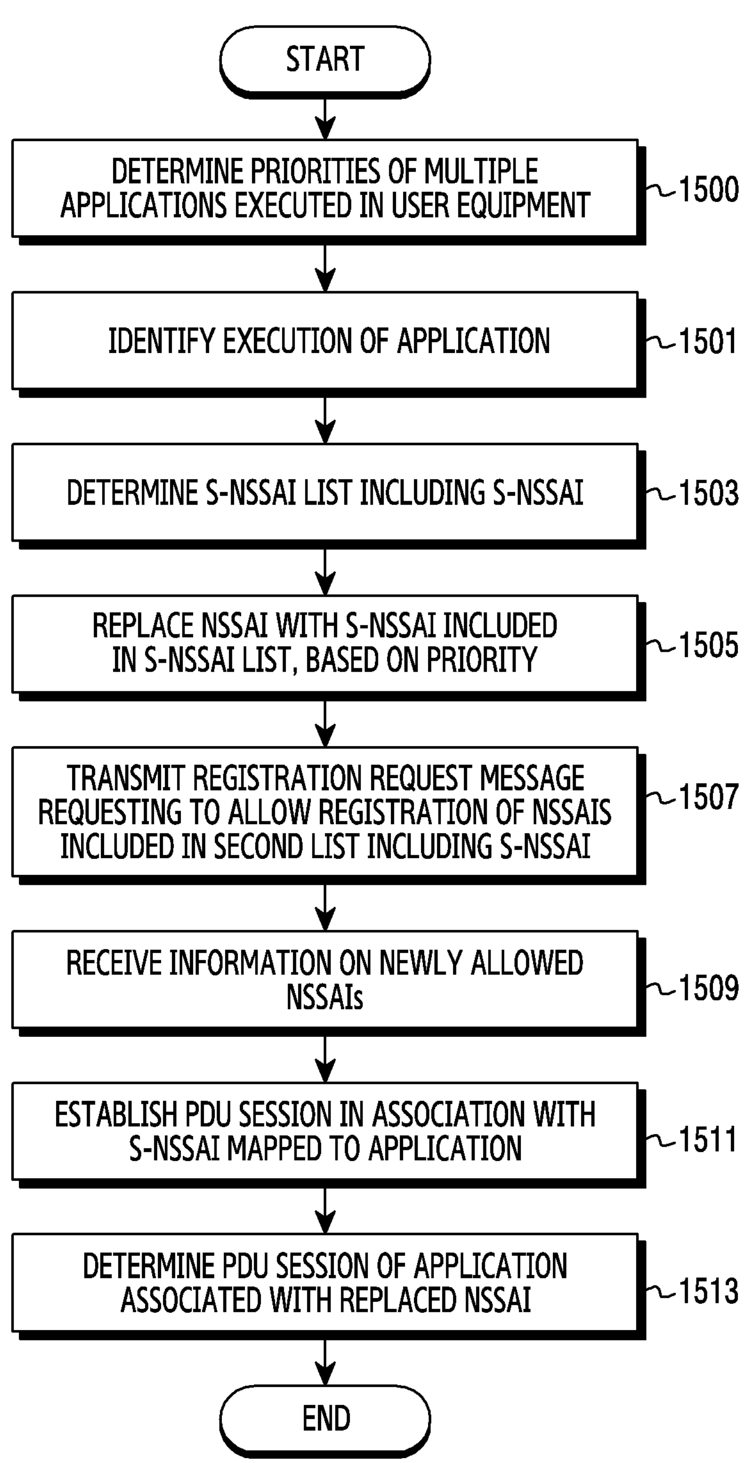
FIG. 15 is a diagram illustrating a method of establishing a PDU session, based on priorities of a plurality of applications according to an embodiment of the disclosure.

FIG. 15 is a diagram illustrating a method of establishing a PDU session, based on the priorities of a plurality of applications according to an embodiment of the disclosure.

Referring to FIG. 15, in operation 1500 according to an embodiment of the disclosure, the user equipment 500 may determine the priorities of a plurality of applications executed in the user equipment 500. According to an embodiment of the disclosure, the plurality of applications may be determined based on a pre-configured parameter or a user input. For example, the priorities of the plurality of applications may be determined based on a frequency of each of the plurality of applications, a total operating time, a quality of service (QoS), a security level of the application, and/or a latency time requirement (latency requirement).

For example, a user may determine a priority corresponding to each of the plurality of applications by using a user input.

Table 2 shows an example of priorities of applications.

TABLE 2

| | Priority value | Application |
|---|---|---|
| User defined | 1 | Application 1 |
| User defined | 2 | Application 2 |
| User defined | 3 | Application 3 |
| Non-user defined | 4 | Application 4 |
| Non-user defined | 5 | Application 5 |
| Non-user defined | 6 | Application 6 |

For example, the lower the priority value, the higher the priority. In an example, the priority of an application directly defined by a user may be determined to be higher than that of an application that is not defined by the user.

Table 3 shows an example of parameters used for determining a priority, based on pre-determined parameters.

TABLE 3

| | Parameter type | Unit |
|---|---|---|
| X1 | Total operating time | Seconds |
| X2 | Frequency of application | Times |
| X3 | Security level | Type |
| X4 | Latency requirement | Type |
| X5 | Total data usage | Byte |
| X6 | Power consumption | Type |
| X7 | Storage memory | Byte |
| X8 | Allowance to access application | Type |

According to an embodiment of the disclosure, the user equipment 500 or an artificial intelligence network in a network connected to the user equipment may identify a priority value by using Equation 1. For example, an input value ($X^T$) for Equation 1 may be X1, X2, X3, X4, X5, X6, X7, and X8. An output value of Equation 1 may be a priority value.

$$F(x)=X^T W \quad \text{Equation 1}$$

According to an embodiment of the disclosure, in operation 1501, the user equipment 500 may identify execution of an application.

According to an embodiment of the disclosure, in operation 1503, the user equipment 500 may determine an S-NSSAI list including an S-NSSAI.

According to an embodiment of the disclosure, in operation 1505, the user equipment 500 may replace or change an NSSAI with or to the S-NSSAI included in the S-NSSAI list, based on the priority of the application. For example, the user equipment 500 may identify the priorities of NSSAIs included in a first list. The NSSAIs included in the first list may be in one-to-one correspondence with a plurality of applications. Each of the NSSAIs included in the first list may follow the priority of an application corresponding thereto. For example, NSSAI 1 included in the first list may correspond to application 1, NSSAI 2 may correspond to application 2, and NSSAI 3 may correspond to application 3. In this case, the priority value of NSSAI 1 may be 1 that is the same as application 1, the priority value of NSSAI 2 may be 2 that is the same as application 2, and the priority value of NSSAI 3 may be 3 that is the same as application 3.

In an example, the user equipment 500 may exclude an NSSAI having the lowest priority among the NSSAIs included in the first list, and generate a second list including the remaining NSSAIs and the S-NSSAI included in the S-NSSAI list.

According to an embodiment of the disclosure, in operation 1507, the user equipment 500 may transmit a registration request message requesting to allow registration of NSSAIs included in the second list including the S-NSSAI.

According to an embodiment of the disclosure, in operation 1509, the user equipment 500 may receive information on newly allowed NSSAIs. For example, the information on the newly allowed NSSAIs may include the S-NSSAI included in the S-NSSAI list. The S-NSSAI included in the S-NSSAI list may correspond to the application executed in operation 1501.

According to an embodiment of the disclosure, in operation 1511, the user equipment 500 may establish a PDU session in association with an S-NSSAI mapped to the application.

According to an embodiment of the disclosure, in operation 1513, the user equipment 500 may determine or change a PDU session of an application associated with the replaced NSSAI. For example, according to exclusion of an NSSAI having a low priority among the NSSAIs included in the first list in operation 1505, connection of a PDU session related to the NSSAI having the low priority may be released. The application related to the PDU session, the connection of which has been released, may be required to associated with a different PDU session for data communication. Therefore, the user equipment 500 may change a PDU session of an application associated with the replaced NSSAI.

Figure 16:
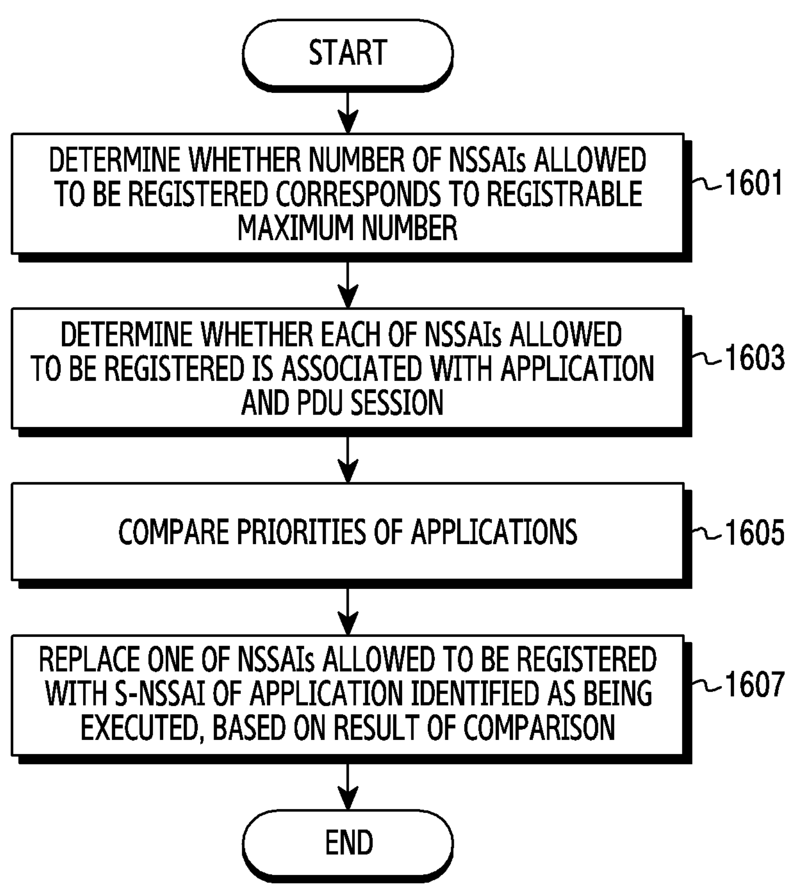
FIG. 16 illustrates a method of comparing priorities of applications and replacing one of NSSAIs of a first list with an S-NSSAI according to an embodiment of the disclosure.

FIG. 16 illustrates a method of comparing priorities of applications and replacing one of NSSAIs of a first list with an S-NSSAI according to an embodiment of the disclosure.

Referring to FIG. 16, in operation 1601 according to an embodiment of the disclosure, the user equipment 500 may determine whether the number of NSSAIs allowed to be registered corresponds to a registrable maximum number. For example, when a maximum number of NSSAIs for that the CN 305 is able to allow registration for the user equipment 500 is 8, the user equipment 500 may determine whether the number of NSSAIs allowed by the CN 305 to be registered is 8.

According to an embodiment of the disclosure, in operation 1603, the user equipment 500 may determine whether each of the NSSAIs allowed to be registered is associated with an application and a PDU session. For example, the user equipment 500 may determine whether there is an application to which each of the NSSAIs allowed to be registered is mapped. For example, the user equipment 500 may determine whether each of the NSSAIs allowed to be registered is associated with a connected PDU session.

According to an embodiment of the disclosure, in operation 1605, the user equipment 500 may compare the priorities of the applications. For example, when the NSSAIs allowed to be registered are associated with applications and are associated with connected PDU sessions, respectively, the user equipment 500 may compare the priorities of the applications.

According to an embodiment of the disclosure, in operation 1607, the user equipment 500 may replace one of NSSAIs in a first list with an S-NSSAI mapped to an executed application, based on a result of the comparison. For example, the user equipment 500 may replace a first NSSAI having the lowest priority among the NSSAIs allowed to be registered, with the S-NSSAI mapped to the executed application. For example, the user equipment 500 may exclude, from the first list, the first NSSAI having the lowest priority among the NSSAIs allowed to be registered, and generate a second list including the remaining NSSAIs and the S-NSSAI mapped to the executed application.

According to an embodiment of the disclosure, the executed application may correspond to the application executed in operation 601 of FIG. 6, or the application executed in operation 1501 of FIG. 15.

Figure 17:
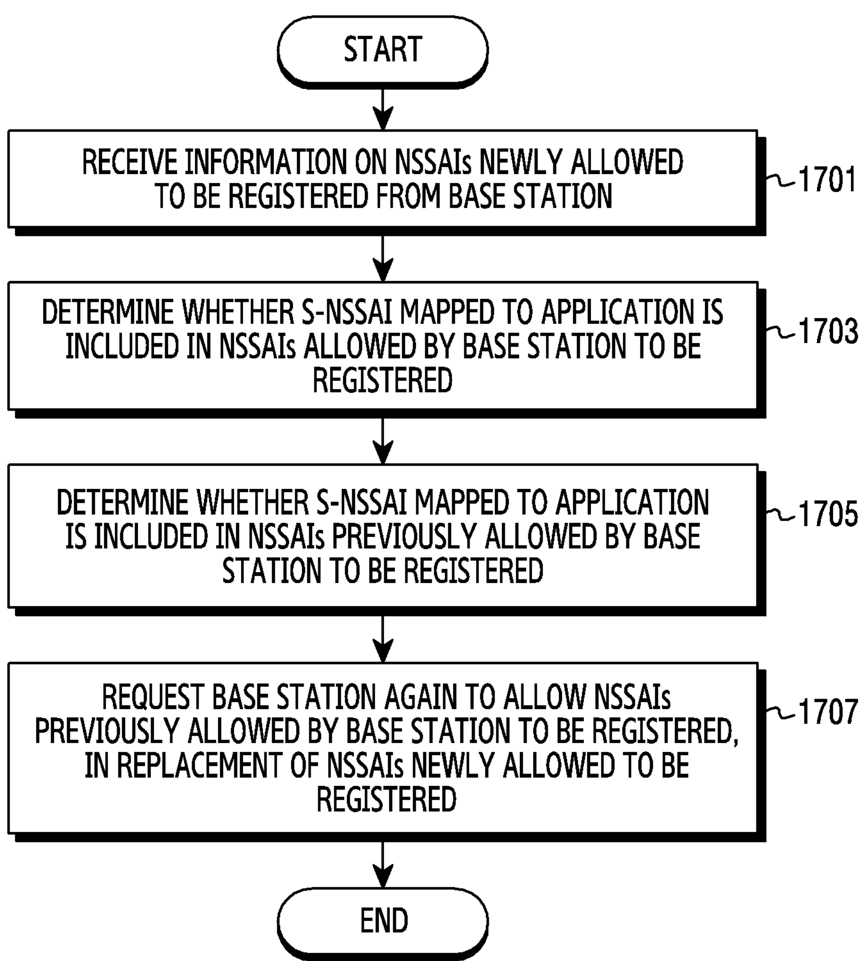
FIG. 17 is a diagram illustrating a method of, when a CN does not allow registration of an S-NSSAI mapped to an executed application, requesting re-allowance of previously allowed NSSAIs according to an embodiment of the disclosure.

FIG. 17 is a diagram illustrating a method of, when a CN does not allow registration of an S-NSSAI mapped to an executed application, requesting re-allowance of previously allowed NSSAIs according to an embodiment of the disclosure.

Referring to FIG. 17, in operation 1701 according to an embodiment of the disclosure, the user equipment 500 may receive information on NSSAIs newly allowed to be registered from the CN 305. For example, the user equipment 500 may transmit a second list including an S-NSSAI corresponding to an executed application to the base station, and may request the CN 305 to allow registration of NSSAIs included in the second list. In an example, the CN 305 may allow registration of at least some of the NSSAIs for the user equipment 500 in response to the request to allow registration transmitted by the user equipment 500.

According to an embodiment of the disclosure, in operation 1703, the user equipment 500 may determine whether the S-NSSAI mapped to the application is included in the NSSAIs allowed by the CN 305 to be registered. For example, when the S-NSSAI mapped to the application is included in the NSSAIs allowed by the CN 305 to be registered, the user equipment 500 may establish a PDU session by using the S-NSSAI. As another example, the S-NSSAI corresponding to the executed application may not be included in the NSSAIs newly allowed by the CN 305. According to an embodiment of the disclosure, in operation 1705, the user equipment 500 may determine whether the S-NSSAI mapped to the application is included in the NSSAIs previously allowed by the CN 305 to be registered.

According to an embodiment of the disclosure, in operation 1707, the user equipment 500 may request to allow NSSAIs having been previously allowed by the CN 305 to be registered, in replacement of the NSSAIs newly allowed to be registered. For example, when the S-NSSAI corresponding to the executed application is not included in the NSSAIs newly allowed to be registered, the user equipment 500 may have difficulty in establishing a PDU session associated with the executed application, and when the S-NSSAI mapped to the application is newly allowed to be registered, a different NSSAI may be excluded. When the different NSSAI is excluded, connection of a PDU session associated with the different NSSAI may be released. Therefore, when the S-NSSAI mapped to the application is not included in the NSSAIs newly allowed to be registered, the user equipment 500 may request, via the base station, the CN 305 to maintain the NSSAIs having been previously allowed to be registered.

A method performed by a user equipment in a wireless communication system according to an embodiment of the disclosure may include executing an application in the user equipment, identifying a URSP rule mapped to the application, based on configuration information on the application, identifying an S-NSSAI mapped to the application, based on the URSP rule mapped to the application, and transmitting a message requesting registration of the S-NSSAI mapped to the application to a core network via a base station. The S-NSSAI may correspond to an NSSAI not allowed by the core network to be registered among NSSAIs configured for the user equipment.

According to an embodiment of the disclosure, the identifying of the URSP rule mapped to the application may include identifying the URSP rule including a traffic descriptor (TD) mapped to the application among a plurality of URSP rules, based on the configuration information on the application. Each of the plurality of URSP rules may correspond to a non-default URSP rule.

According to an embodiment of the disclosure, the identifying of the S-NSSAI mapped to the application may include identifying a route selection descriptor (RSD) of the URSP rule including the TD mapped to the application, determining whether there is a packet data unit (PDU) session mapped to the identified RSD among a plurality of PDU sessions in which connection are established, and in case that the PDU session mapped to the identified RSD does not exist among the plurality of PDU sessions, identifying the S-NSSAI mapped to the application.

According to an embodiment of the disclosure, the method may further include receiving, from the base station, a message notifying that the registration of the S-NSSAI mapped to the application has been allowed, and establishing a packet data unit (PDU) session associated with the application, based on the S-NSSAI having been allowed to be registered.

According to an embodiment of the disclosure, the method may further include receiving, from the base station, a message notifying that the registration of the S-NSSAI mapped to the application has not been allowed, and establishing a packet data unit (PDU) session associated with the application by using a pre-configured default URSP rule.

According to an embodiment of the disclosure, the pre-configured default URSP rule may include at least one parameter applicable commonly to a plurality of applications executed in the user equipment. The establishing of the PDU session associated with the application by using the pre-configured default URSP rule may include establishing the PDU session associated with the application by applying the at least one parameter.

According to an embodiment of the disclosure, the method may include transmitting a message requesting registration for NSSAIs included in a first list to the core network via the base station, and receiving, from the base station, a message indicating that registration of at least some NSSAIs among the NSSAIs included in the first list is allowed. The S-NSSAI mapped to the application may not be included in the first list.

According to an embodiment of the disclosure, the method may include generating a second list including the S-NSSAI mapped to the application, transmitting a message requesting registration for NSSAIs included in the second list to the core network via the base station, and establishing a packet data unit (PDU) session associated with the application according to allowance of, by the core network, registration of the S-NSSAI mapped to the application.

According to an embodiment of the disclosure, the second list may include the S-NSSAI and the at least some NSSAIs allowed to be registered among the NSSAIs included in the first list.

According to an embodiment of the disclosure, the second list may include the S-NSSAI and NSSAIs related to connected PDU sessions among the NSSAIs included in the first list.

According to an embodiment of the disclosure, the second list may include the S-NSSAI in replacement of an NSSAI having a lowest priority among the NSSAIs included in the first list.

According to an embodiment of the disclosure, the method may further include determining whether an NSSAI of a route selection descriptor (RSD) included in the URSP rule mapped to the application is included in NSSAIs allowed by the core network to be registered.

According to an embodiment of the disclosure, the method may include determining whether the number of NSSAIs allowed by the core network to be registered corresponds to a registrable maximum number, in case that the number of the NSSAIs allowed to be registered corresponds to the registrable maximum number, determining whether there is an NSSAI associated with a packet data unit (PDU) session having not been connected among the NSSAIs allowed to be registered, and transmitting, to the core network via the base station, the message requesting the registration of the S-NSSAI mapped to the application in replacement of the NSSAI associated with the PDU session having not been connected.

According to an embodiment of the disclosure, the method may include, in case that the number of the NSSAIs allowed to be registered is less than the registrable maximum number, transmitting, to the base station, the message requesting the registration of the S-NSSAI mapped to the application in replacement of an NSSAI not allowed to be registered among NSSAIs for which the core network has been requested to allow registration.

A user equipment in a wireless communication system according to an embodiment of the disclosure may include a transceiver and at least one processor. The at least one processor may execute an application in the user equipment, and identify a URSP rule mapped to the application, based on configuration information on the application. The at least one processor may identify an S-NSSAI mapped to the application, based on the URSP rule mapped to the application, and transmit a message requesting registration of the S-NSSAI mapped to the application to the core network via the base station. The S-NSSAI may correspond to an NSSAI not allowed by the core network to be registered among NSSAIs configured for the user equipment.

According to an embodiment of the disclosure, the at least one processor may identify the URSP rule including a traffic descriptor (TD) mapped to the application among a plurality of URSP rules, based on the configuration information on the application, and each of the plurality of URSP rules may correspond to a non-default URSP rule.

According to an embodiment of the disclosure, the at least one processor may identify a route selection descriptor (RSD) of the URSP rule including the TD mapped to the application, and determine whether a packet data unit (PDU) session mapped to the identified RSD exists among a plurality of PDU sessions in which connection are established. In case that the PDU session mapped to the identified RSD does not exist among the plurality of PDU sessions, the at least one processor may identify the S-NSSAI mapped to the application.

According to an embodiment of the disclosure, the at least one processor may receive, from the base station, a message notifying that the registration of the S-NSSAI mapped to the application has been allowed, and establish, with the core network, a packet data unit (PDU) session associated with the application, based on the S-NSSAI having been allowed to be registered.

According to an embodiment of the disclosure, the at least one processor may receive, from the base station, a message notifying that the registration of the S-NSSAI mapped to the application has not been allowed, and establish, with the core network, a packet data unit (PDU) session associated with the application by using a pre-configured default URSP rule.

According to an embodiment of the disclosure, the pre-configured default URSP rule may include at least one parameter applicable commonly to a plurality of applications executed in the user equipment. The at least one processor may establish the PDU session associated with the application by applying the at least one parameter.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a user equipment (UE) in a wireless communication system, the method comprising:

executing a first application of the UE;

identifying a UE route selection policy (URSP) rule mapped with the first application, based on configuration information on the first application;

identifying a first single-network slice selection assistance information (S-NSSAI) mapped with the first application, based on the URSP rule mapped with the first application, wherein the first S-NSSAI is not registered for the UE;

in case that a number of S-NSSAIs registered for the UE corresponds to a maximum number, identifying a second S-NSSAI mapped with a second application having a lowest priority among the S-NSSAIs registered for the UE; and transmitting, to a core network via a base station, a message for requesting registration of the first S-NSSAI mapped with the first application, wherein the message includes an S-NSSAI list including the first S-NSSAI in replacement of the second S-NSSAI registered for the UE.

2. The method of claim 1, wherein the identifying of the URSP rule mapped with the first application comprises identifying the URSP rule including a traffic descriptor (TD) mapped with the first application among a plurality of URSP rules, based on the configuration information on the first application, and wherein each of the plurality of URSP rules corresponds to a non-default URSP rule.

3. The method of claim 2, wherein the identifying of the first S-NSSAI mapped with the first application comprises:

identifying a route selection descriptor (RSD) of the URSP rule including the TD mapped with the first application;

determining whether a protocol data unit (PDU) session mapped with the identified RSD exists among a plurality of PDU sessions in which connections are established; and in case that the PDU session mapped with identified RSD does not exist among the plurality of PDU sessions, identifying the first S-NSSAI mapped with the first application.

4. The method of claim 1, further comprising:
receiving, from the base station, a message for notifying that the registration of the first S-NSSAI mapped with the first application has been allowed; and
establishing a protocol data unit (PDU) session associated with the first application, based on the first S-NSSAI that has been allowed to be registered.

5. The method of claim 1, further comprising:
receiving, from the base station, a message for notifying that the registration of the first S-NSSAI mapped with the first application has not been allowed; and
establishing a protocol data unit (PDU) session associated with the first application by using a pre-configured default URSP rule.

6. The method of claim 5,
wherein the pre-configured default URSP rule comprises at least one parameter applicable commonly to a plurality of applications executed in the UE, and
wherein the establishing of the PDU session associated with the first application by using the pre-configured default URSP rule comprises establishing the PDU session associated with the first application by applying the at least one parameter.

7. The method of claim 1, further comprising:
transmitting, to the core network via the base station, a message for requesting registration for S-NSSAIs included in a first list before transmitting the message including the S-NSSAI list including the first S-NSSAI; and
receiving, from the base station, a message indicating that registration of at least some S-NSSAIs among the S-NSSAIs included in the first list is allowed,
wherein the first S-NSSAI mapped with the first application is not included in the first list.

8. The method of claim 7, further comprising:
generating a second list corresponding to the S-NSSAI list including the first S-NSSAI mapped to the first application;
transmitting, to the core network via the base station, a message for requesting registration for S-NSSAIs included in the second list; and
establishing a protocol data unit (PDU) session associated with the first application according to allowance of registration of the first S-NSSAI.

9. The method of claim 8, wherein the second list comprises the first S-NSSAI and the at least some S-NSSAIs.

10. The method of claim 8, wherein the second list comprises the first S-NSSAI and S-NSSAIs related to connected PDU sessions among the S-NSSAIs included in the first list.

11. The method of claim 1, further comprising:
determining whether an S-NSSAI of a route selection descriptor (RSD) included in the URSP rule is included in S-NSSAIs allowed by the core network to be registered.

12. The method of claim 1, further comprising:
determining whether the number of the S-NSSAIs registered for the UE corresponds to the maximum number;
in case that the number of the S-NSSAIs corresponds to the maximum number, determining whether an S-NSSAI associated with a protocol data unit (PDU) session that has not been connected exists among the S-NSSAIs registered for the UE; and
transmitting, to the core network via the base station, the message for requesting the registration of the first S-NSSAI mapped with the first application in replacement of the S-NSSAI associated with the PDU session that has not been connected.

13. The method of claim 12, further comprising:
in case that the number of the S-NSSAIs is less than the maximum number, transmitting, to the base station, the message for requesting the registration of the first S-NSSAI mapped with the first application in replacement of an S-NSSAI which is not allowed to be registered among S-NSSAIs for which the core network has been requested to allow registration.

14. A user equipment (UE) in a wireless communication system, the UE comprising:
a transceiver;
at least one processor; and
memory storing instructions, when executed by the at least one processor, that cause the UE to:
execute a first application of the UE,
identify a UE route selection (URSP) rule mapped with the first application, based on configuration information on the first application,
identify a first single-network slice selection assistance information (S-NSSAI) mapped with the first application, based on the URSP rule mapped with the first application, wherein the first S-NSSAI is not registered for the UE,
in case that a number of S-NSSAIs registered for the UE corresponds to a maximum number, identify a second S-NSSAI mapped with a second application having a lowest priority among the S-NSSAIs registered for the UE, and
transmit, to a core network via a base station, a message for requesting registration of the first S-NSSAI mapped with the first application,
wherein the message includes an S-NSSAI list including the first S-NSSAI in replacement of the second S-NSSAI registered for the UE.

15. The UE of claim 14,
wherein the instructions further cause the UE to:
identify the URSP rule including a traffic descriptor (TD) mapped to the with the first application among a plurality of URSP rules, based on the configuration information on the first application, and
wherein each of the plurality of URSP rules corresponds to a non-default URSP rule.

16. The UE of claim 15, wherein the instructions further cause the UE to:
identify a route selection descriptor (RSD) of the URSP rule including the TD mapped with the first application,
determine whether a protocol data unit (PDU) session mapped with the identified RSD exists among a plurality of PDU sessions in which connections are established, and
in case that the PDU session mapped with the identified RSD does not exist among the plurality of PDU sessions, identify the first S-NSSAI mapped with the first application.

17. The UE of claim 14, wherein the instructions further cause the UE to:
receive, from the base station, a message for notifying that the registration of the first S-NSSAI mapped with the first application has been allowed, and
establish a protocol data unit (PDU) session associated with the first application, based on the first S-NSSAI that has been allowed to be registered.

18. The UE of claim 14, wherein the instructions further cause the UE to:

receive, from the base station, a message for notifying that the registration of the first S-NSSAI mapped with the first application has not been allowed, and establish a protocol data unit (PDU) session associated with the first application by using a pre-configured default URSP rule.

19. The UE of claim 18, wherein the pre-configured default URSP rule comprises at least one parameter applicable commonly to a plurality of applications executed in the UE and wherein the instructions further cause the UE to:

establish the PDU session associated with the first application by applying the at least one parameter.

* * * * *